(12) United States Patent
Liu et al.

(10) Patent No.: US 9,138,972 B2
(45) Date of Patent: Sep. 22, 2015

(54) ASSEMBLING MACHINE AND METHOD

(71) Applicants: LITE-ON ELECTRONICS (GUANGZHOU) LIMITED, Guangzhou (CN); LITE-ON TECHNOLOGY CORP., Taipei (TW)

(72) Inventors: Chih-Li Liu, Taipei (TW); Jen-Min Huang, Taipei (TW)

(73) Assignees: Lite-on Electronics (Guangzhou) Limited, Guangzhou (CN); Lite-on Technology Corp., Taipei (TW)

( * ) Notice: Subject to any disclaimer, the term of this patent is extended or adjusted under 35 U.S.C. 154(b) by 94 days.

(21) Appl. No.: 14/022,404

(22) Filed: Sep. 10, 2013

(65) Prior Publication Data

US 2014/0069569 A1    Mar. 13, 2014

(30) Foreign Application Priority Data

Sep. 13, 2012  (CN) .......................... 2012 1 0338444

(51) Int. Cl.
*B29C 65/00* (2006.01)
*B29C 65/02* (2006.01)
*B32B 37/00* (2006.01)
*B32B 38/00* (2006.01)
*B65C 9/22* (2006.01)
(Continued)

(52) U.S. Cl.
CPC ............. *B32B 37/0046* (2013.01); *B23P 19/02* (2013.01); *B29C 65/48* (2013.01); *B29C 65/52* (2013.01); *B29C 65/524* (2013.01); *B29C 66/5324* (2013.01); *B29C 66/8322* (2013.01); *F21K 9/17* (2013.01); *F21K 9/90* (2013.01); *F21Y 2101/02* (2013.01); *F21Y 2103/003* (2013.01)

(58) Field of Classification Search
CPC ........ B29C 65/00; B29C 65/48; B29C 65/52; B29C 65/524; B29C 65/525; B29C 65/78; B29C 65/7802; B29C 65/7838; B29C 65/7858; B29C 65/7861; B29C 65/7864; B29C 66/00; B29C 66/80; B29C 66/83; B29C 66/832; B29C 66/8322; B29C 66/834; B29C 66/50; B29C 66/51; B29C 66/53; B29C 66/532; B29C 66/5324; A01G 25/026; F21Y 2103/003; B32B 37/00; B32B 37/0046
USPC .......... 156/60, 64, 293, 294, 295, 296, 303.1, 156/349, 350, 351, 356, 357, 358, 362, 363, 156/366, 378, 391, 423, 538, 539, 556, 574, 156/575, 578, 580; 239/266, 267, 268, 269; 362/217.01
See application file for complete search history.

(56) References Cited

U.S. PATENT DOCUMENTS

| | | | | | |
|---|---|---|---|---|---|
| 3,981,452 | A | * | 9/1976 | Eckstein | 239/542 |
| 4,968,368 | A | * | 11/1990 | Moody | 156/187 |
| 2012/0182728 | A1 | * | 7/2012 | Watanabe | 362/218 |

*Primary Examiner* — Philip Tucker
*Assistant Examiner* — Brian R Slawski
(74) *Attorney, Agent, or Firm* — Rosenberg, Klein & Lee

(57) ABSTRACT

An assembling machine for assembling an elongated module into a tubular body includes a holding assembly disposed on a base for holding the tubular body, a conveying assembly slidably connected to the base and having a cantilever for holding the elongated module and adapted to extend into the tubular body through a first opening thereof with the elongated module partially protruding from a second opening thereof, and a dispenser positioned between the cantilever and the holding assembly for dispensing adhesive on a joint surface of the elongated module. The holding assembly is adapted to drive the tubular body to move to a pressed position, so that an inner surface of the tubular body is pressed against the joint surface of the elongated module.

5 Claims, 34 Drawing Sheets

(51) Int. Cl.
| | |
|---|---|
| *B32B 41/02* | (2006.01) |
| *B65C 9/40* | (2006.01) |
| *G05G 15/00* | (2006.01) |
| *B65C 9/26* | (2006.01) |
| *B29C 65/78* | (2006.01) |
| *B31F 5/00* | (2006.01) |
| *B65H 29/00* | (2006.01) |
| *B65C 11/04* | (2006.01) |
| *F21V 21/00* | (2006.01) |
| *B23P 19/02* | (2006.01) |
| *B29C 65/48* | (2006.01) |
| *B29C 65/52* | (2006.01) |
| *F21K 99/00* | (2010.01) |
| *F21Y 101/02* | (2006.01) |
| *F21Y 103/00* | (2006.01) |

ASSEMBLING MACHINE AND METHOD

CROSS-REFERENCE TO RELATED APPLICATION

This application claims priority of Chinese Application No. 201210338444.7, filed on Sep. 13, 2012, the disclosure of which is hereby incorporated by reference in its entirety.

BACKGROUND OF THE INVENTION

1. Field of the Invention

The invention relates to an assembling machine and an assembling method, more particularly to an assembling machine for assembling an elongated module into a tubular body and an associated method therefor.

2. Description of the Related Art

A current LED tube typically includes a heat dissipation substrate, a plurality of LEDs mounted thereon, and a tubular glass body. A method for assembling the heat dissipation substrate into the tubular glass body includes manually dispensing an adhesive upon one side of the heat dissipation substrate firstly, and then inserting the heat dissipation substrate into the tubular glass body so that the side of the heat dissipation substrate with the adhesive adheres to an inner surface of the tubular glass body. When the adhesive sets, the heat dissipation substrate is securely fastened to the tubular glass body.

Because the current assembling method for the heat dissipation substrate and the tubular glass body requires manual labor, the method is inefficient and the speed of assembly is relatively slow, thereby increasing the production cost. Further, manually dispensing the adhesive on the heat dissipation substrate may result in a nonuniform coating of adhesive on the heat dissipation substrate, so that the heat dissipation substrate cannot be securely adhered to the tubular glass body. Additionally, manually inserting the heat dissipation substrate into the tubular glass body may scratch a diffusion layer coated on the inner surface of the tubular glass body, thereby damaging the tubular glass body such that it must be discarded. Thus, the defective rate during production is increased.

SUMMARY OF THE INVENTION

Therefore, an object of the present invention is to provide an assembling machine and method that can automatically and securely assemble an elongated module into a tubular body, so that speed of assembly and efficiency thereof can be enhanced, thereby increasing the assembly yield and reducing the production costs associated therewith.

The advantages and effects of the assembling machine and method of the present invention reside in that by using the design of the holding device, the supporting device, the conveying device, the dispensing device, and the control device to automatically assemble the elongated module inside the tubular body, speed of assembly and efficiency thereof can be enhanced, thereby reducing the production costs associated therewith. Further, the elongated module is prevented from scratching the inner surface of the tubular body during assembly, so that discarding of the tubular body due to damage can be reduced, thereby enhancing the production yield. Additionally, by using the dispensing device to replace manual dispensing of the adhesive, the adhesive can be coated uniformly on the joint surface of the elongated module, thereby preventing nonuniform coating of the adhesive.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
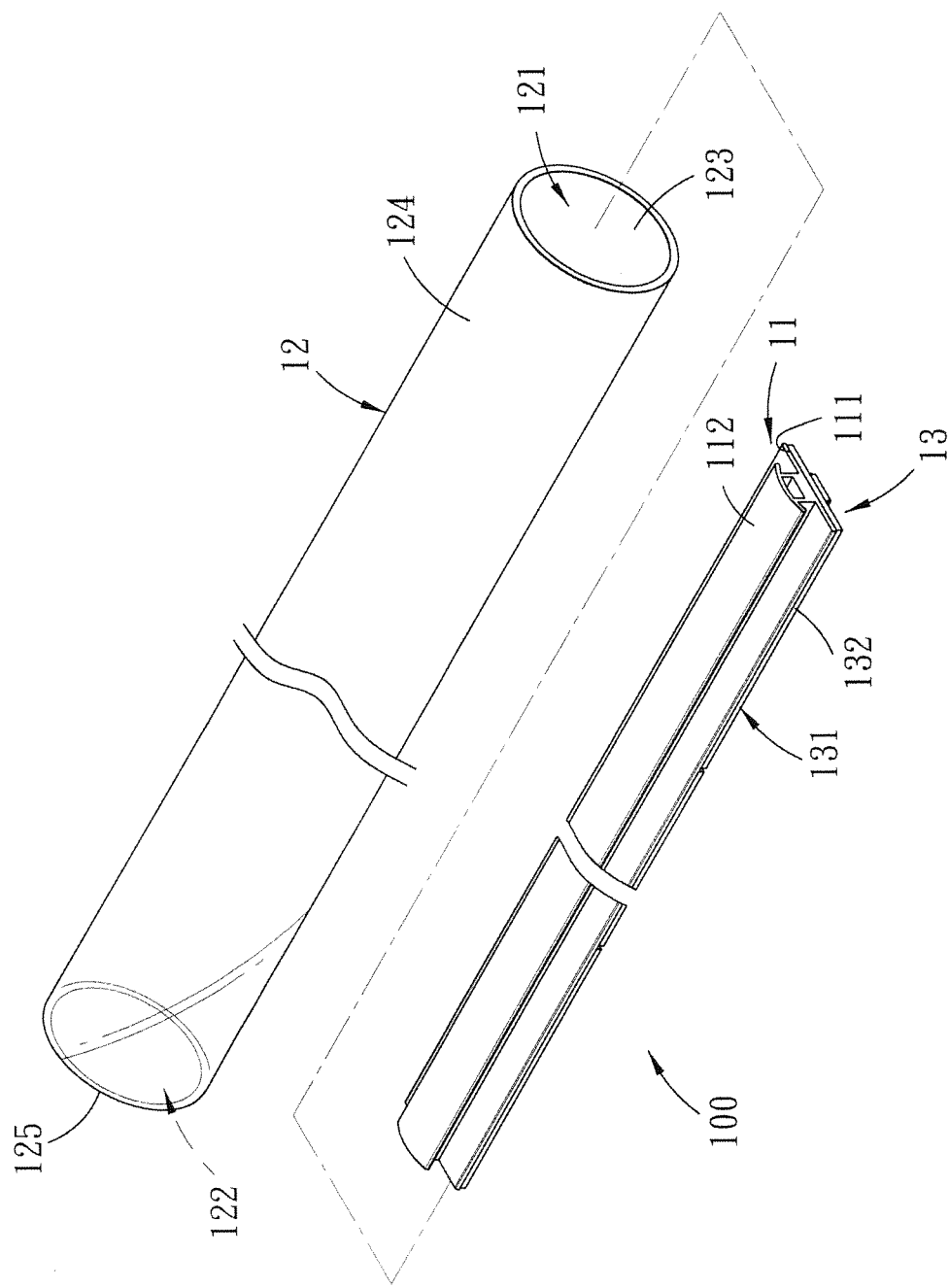
FIG. 1 is an exploded perspective view of a tubular body and an elongated module which are to be assembled using an assembling machine of the present invention.

The above-mentioned and other technical contents, features, and effects of this invention will be clearly presented from the following detailed description of two preferred embodiments in coordination with the reference drawings. Through description of the concrete implementation method, the technical means employed and the effectiveness to achieve the predetermined purposes of the present invention will be thoroughly and concretely understood. However, the enclosed drawings are used for reference and description only, and are not used for limiting the present invention.

Before this invention is described in detail, it should be noted that, in the following description, similar elements are designated by the same reference numerals.

Figure 2:
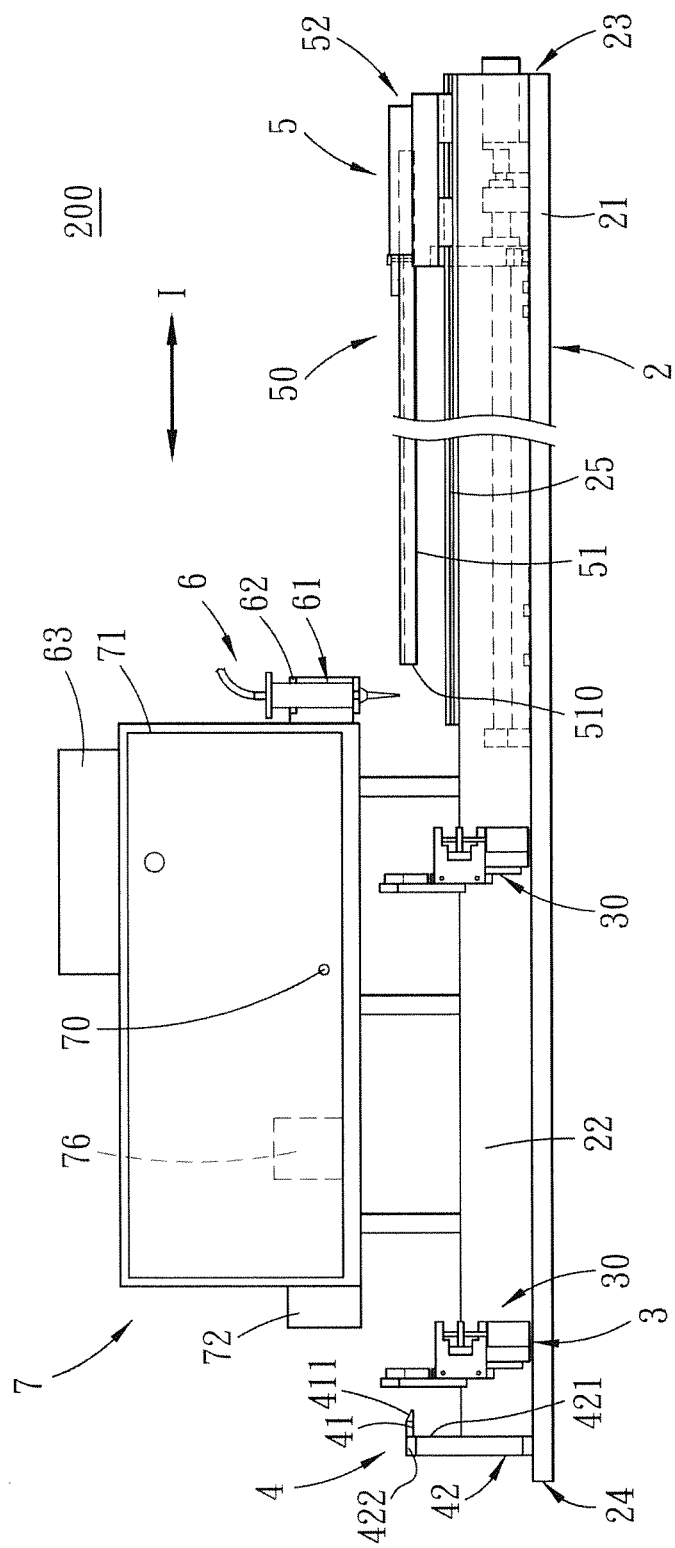
FIG. 2 is a schematic front view of the assembling machine according to the first preferred embodiment of this invention.

Referring to FIGS. 1 and 2, the first preferred embodiment of an assembling machine 200 according to the pre sent invention is suitable for fixedly assembling an elongated module 100 inside a tubular body 12 so that the resulting assembly may be applicable for use in a light tube. In this embodiment, the elongated module 100 includes an elongated heat dissipation substrate 11 that is made of a metal material having good thermal conductivity and that has a plate surface 111 and a joint surface 112 opposite to the plate surface 111. The tubular body 12 may be a glass tube that has a first opening 121 and a second opening 122 at two opposite ends thereof, and opposite inner and outer surfaces 123, 124.

Figure 3:
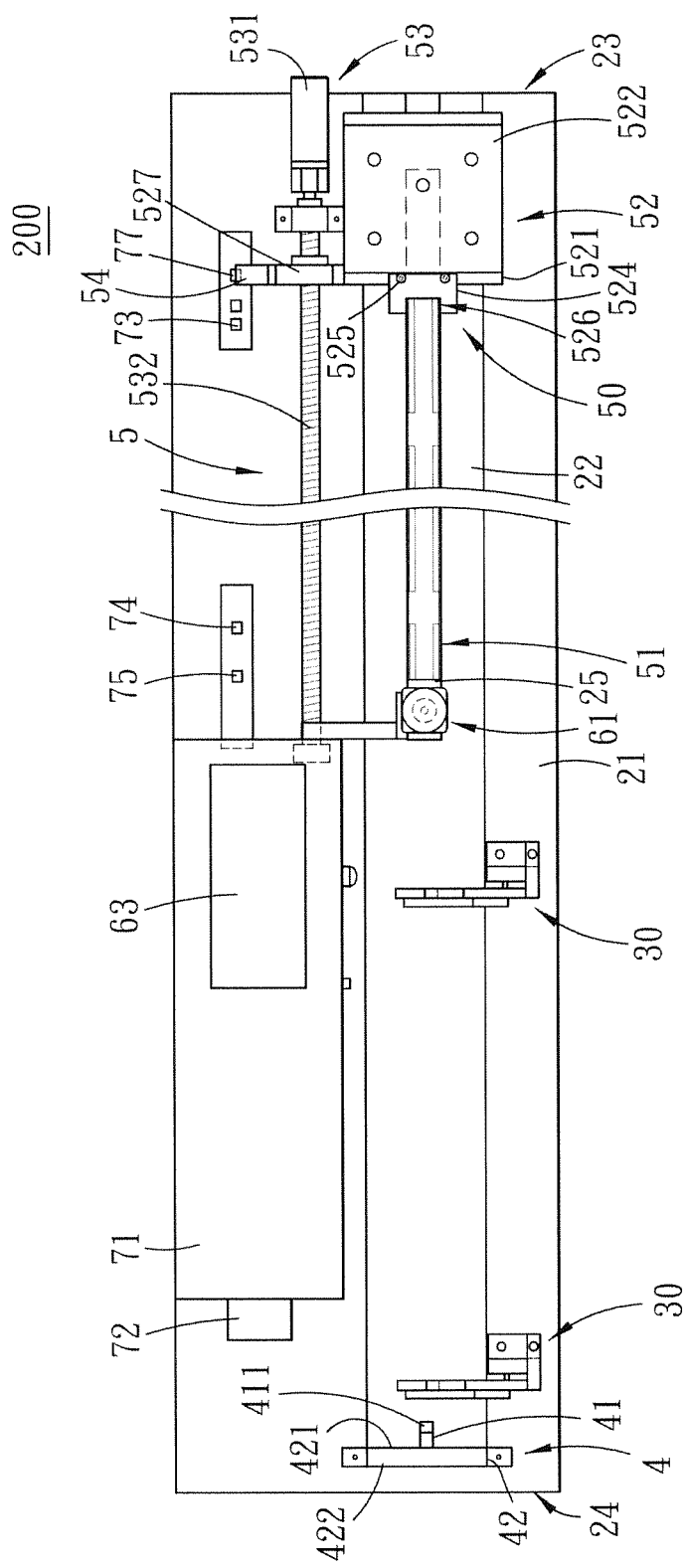
FIG. 3 is a schematic top view of FIG. 2.
Figure 4:
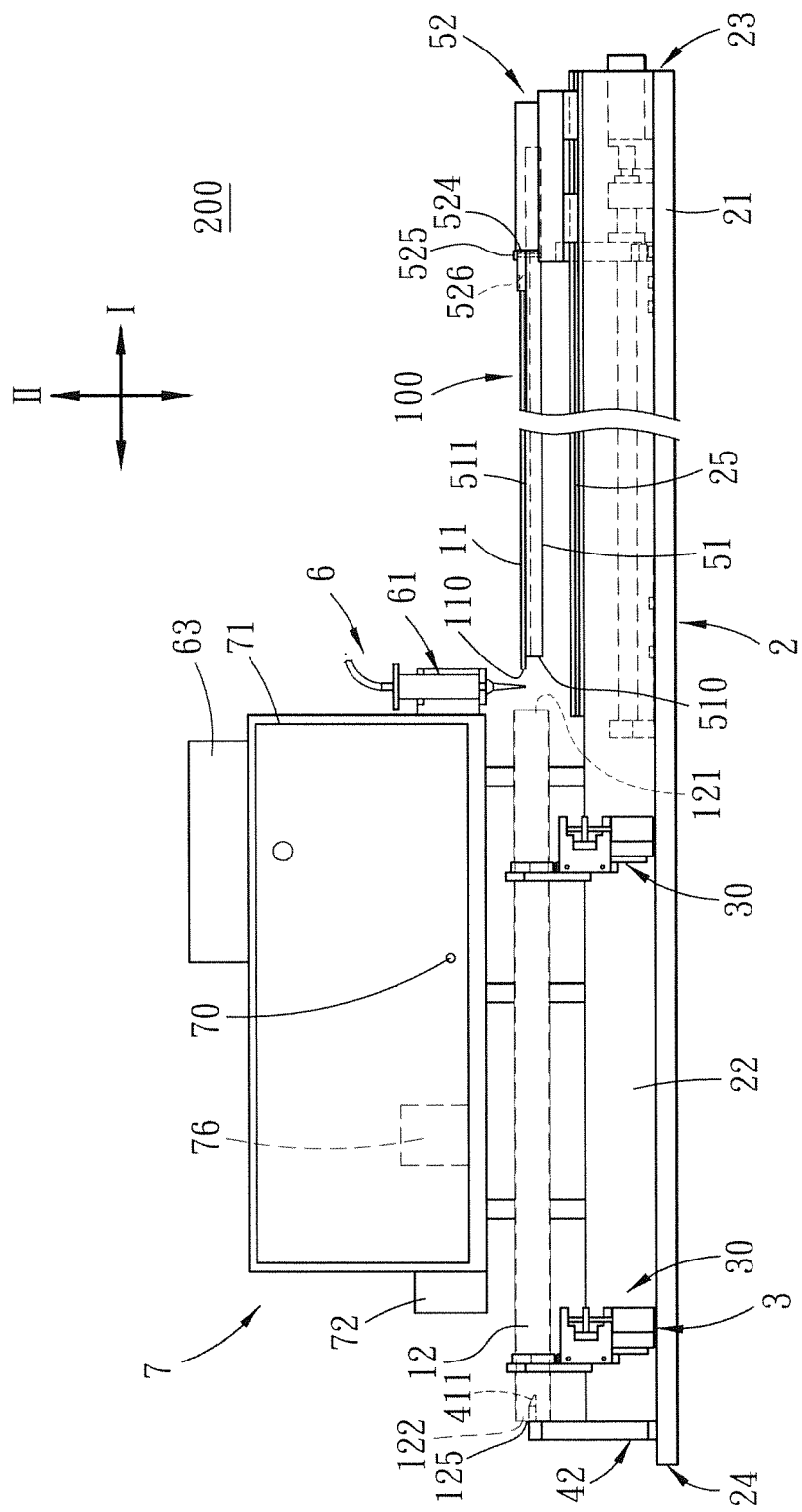
FIG. 4 is a front view similar to FIG. 2, but illustrating the tubular body being positioned on two holding assemblies and the elongated module being positioned on a cantilever.
Figure 5:
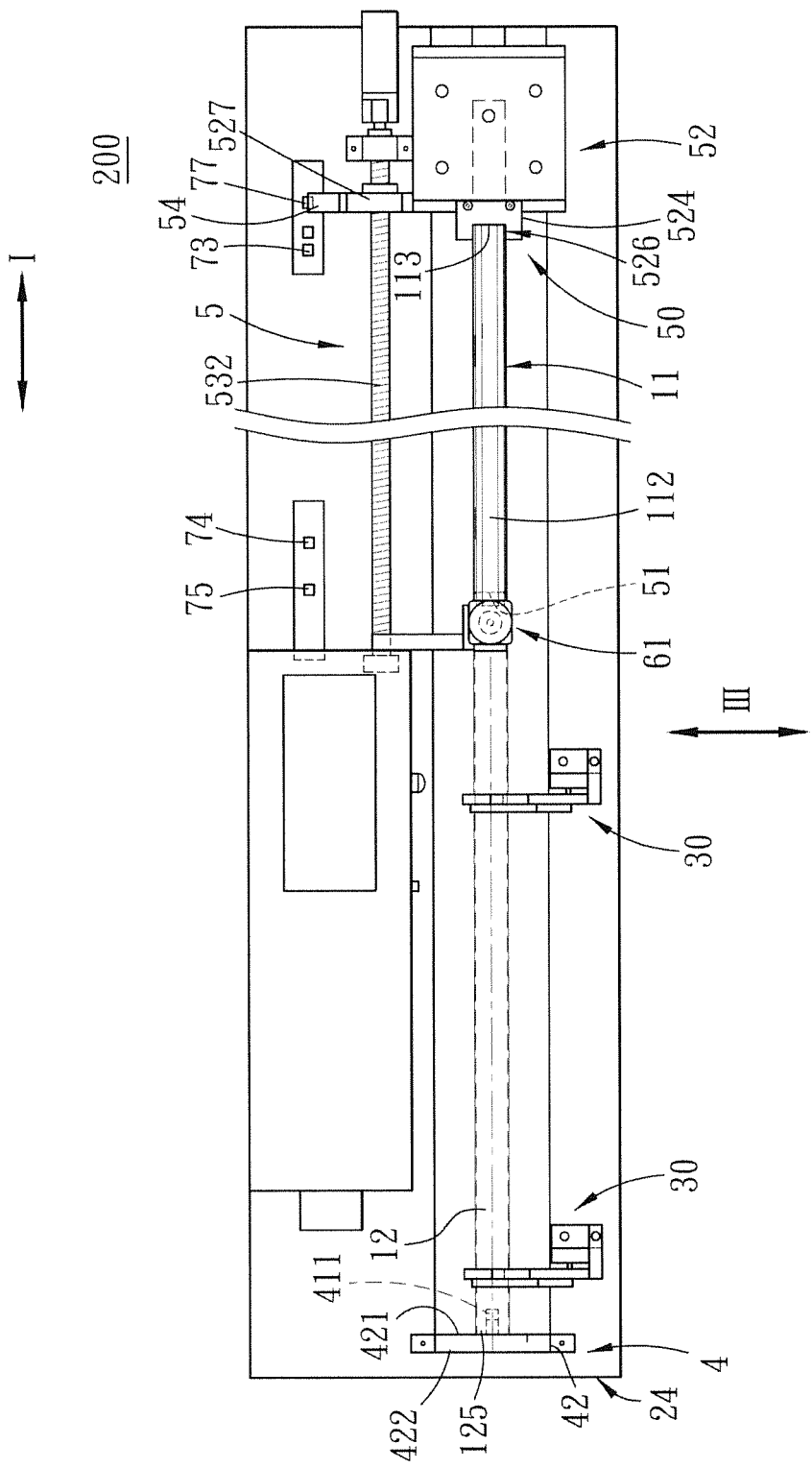
FIG. 5 is a schematic top view of FIG. 4.

Referring to FIGS. 3 to 5, in combination with FIG. 2, the assembling machine 200 comprises a base 2, a holding device 3, a supporting device 4, a conveying device 5, and a dispensing device 6. The base 2 includes a base plate 21 extending in a front-rear direction (I) and having a front end 23 and a rear end 24, and a protruding seat 22 protruding from a top surface of the base plate 21. The holding device 3 includes at least one holding assembly 30 disposed on the protruding seat 22 between the front end 23 and the rear end 24 for holding the tubular body 12 such that an axis of the tubular body 12 is parallel to the front-rear direction (I) and the first and second openings 121, 122 respectively face the front and rear ends 23, 24. The supporting device 4 is disposed on the base plate 21 in proximity to the rear end 24 thereof, and includes a supporting arm 41 that is positioned above and spaced apart from the protruding seat 22 and that is extendable into the tubular body 12 through the second opening 122

Figure 27:
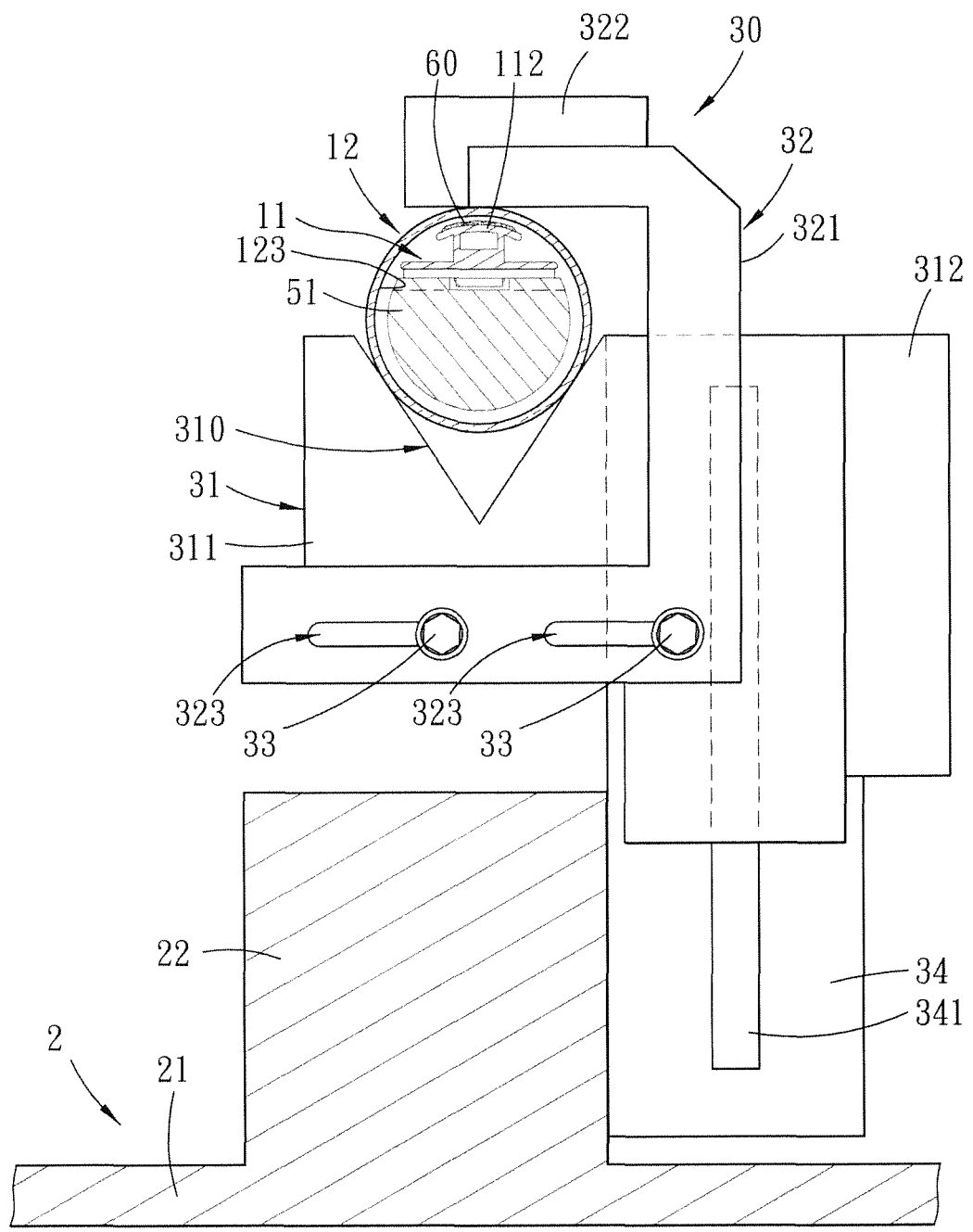
FIG. 27 is an enlarged partial sectional view of the first preferred embodiment, illustrating the heat dissipation substrate being inserted into the tubular body and the tubular body being in a default height position.
Figure 28:
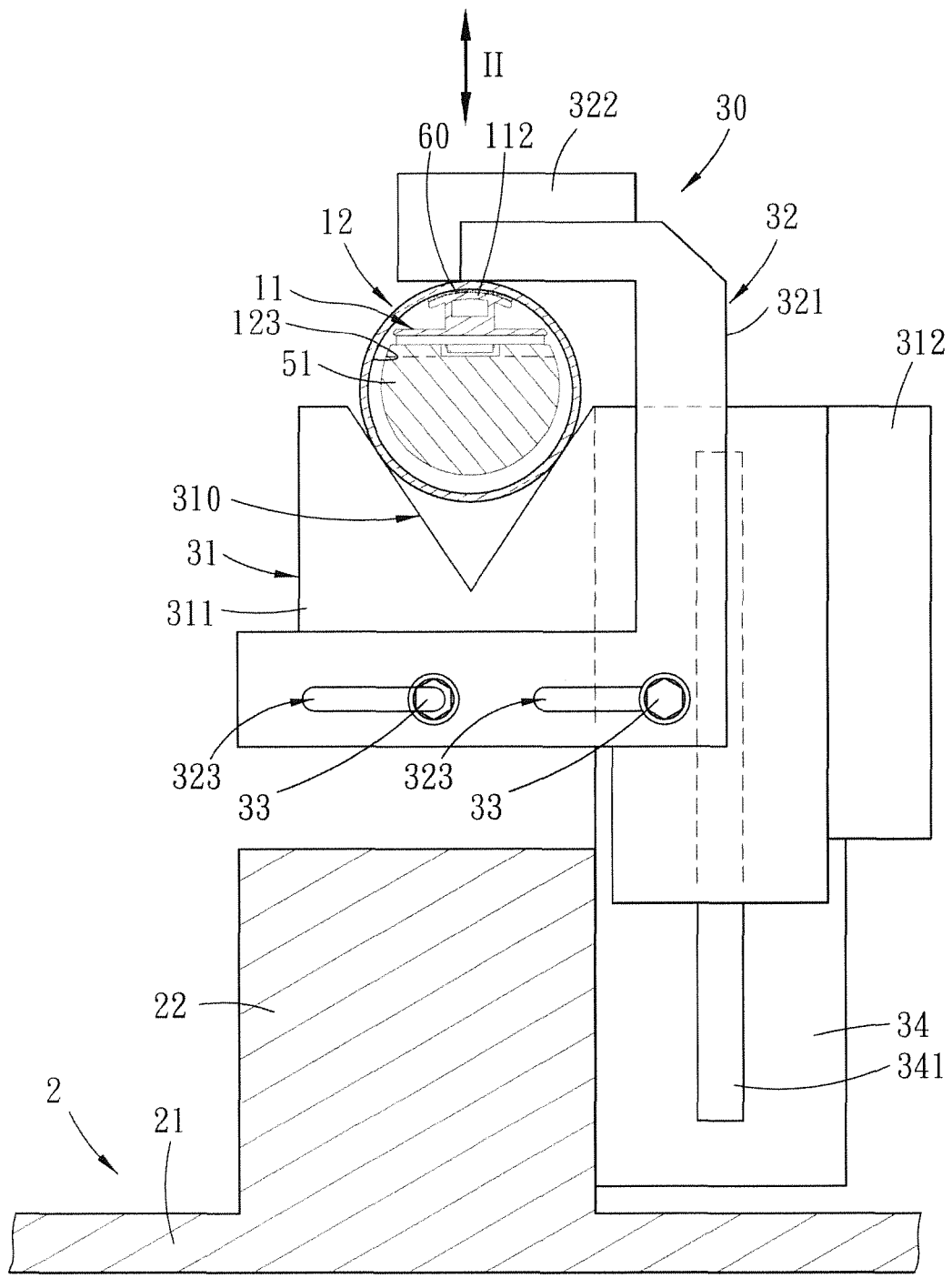
FIG. 28 is a view similar to FIG. 27, but with the tubular body being moved to a pressed position.

The base 2 further includes an elongated slide rail 25 disposed on a top surface of the protruding seat 22 and extending in the front-rear direction (I). The conveying device 5 includes a conveying assembly 50 that is proximate to the front end 23 and that is slidably connected to the slide rail 25. Through the slidable connection of the conveying assembly 50 with the slide rail 25, the conveying assembly 50 is slidable in the front-rear direction (I) relative to the base 2. The conveying assembly 50 includes a cantilever 51 that is disposed above and spaced apart from the slide rail 25 for holding the heat dissipation substrate 11 such that dissipation substrate 11 faces the cantilever 51. The cantilever 51 is movable between a default position (see FIG. 4) and an extended position (see FIG. 26). In the default position, the cantilever 51 is positioned spaced apart from and in front of the first opening 121. In the extended position, the cantilever 51 extends into the tubular body 12 through the first opening 121, and a portion of the heat dissipation substrate 11 protrudes from the second opening 122 and abuts against the supporting arm 41. The dispensing device 6 includes a dispenser 61 disposed above and spaced apart from the protruding seat 22 and positioned between the cantilever 51 and the holding assembly 30. The dispenser 61 is used for dispensing adhesive 60 (see FIG. 22) onto the joint surface 112 of the heat dissipation substrate 11. The holding assembly 30 moves the tubular body 12 in an up-down direction (II) and between a default height position and a pressed position. The pressed position is lower than the default height position. In the default height position, as shown in FIG. 27, the tubular body 12 surrounds the heat dissipation substrate 11, and the inner surface 123 thereof is spaced apart from the joint surface 112 of the heat dissipation substrate 11. In the pressed position, as shown in FIG. 28, the inner surface 123 of the tubular body 12 is pressed against the joint surface 112 of the heat dissipation substrate 11. Hence, the tubular body 112 can automatically be adhered to the joint surface 112 of the heat dissipation substrate 11, and the heat dissipation substrate 11 can be fixedly assembled to the inner surface 123 of the tubular body 12. By using the assembling machine 200 to assemble the heat dissipation substrate 11 of the elongated module 100 and the tubular body 12, the speed of assembly is quick and the efficiency is good, thereby enhancing the assembly yield and reducing the production costs thereof.

Figure 6:
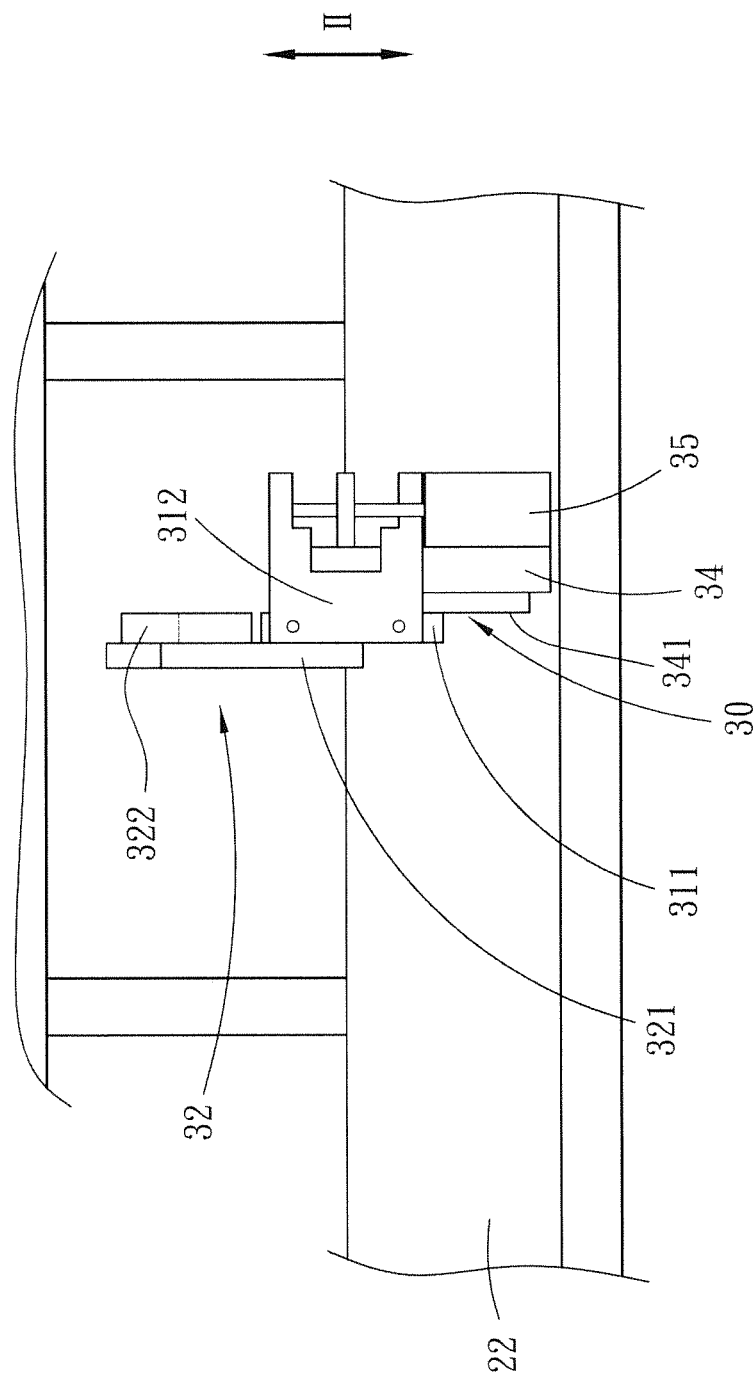
FIG. 6 is an enlarged fragmentary schematic view of FIG. 2, illustrating a detailed structure of the holding assembly.
Figure 7:
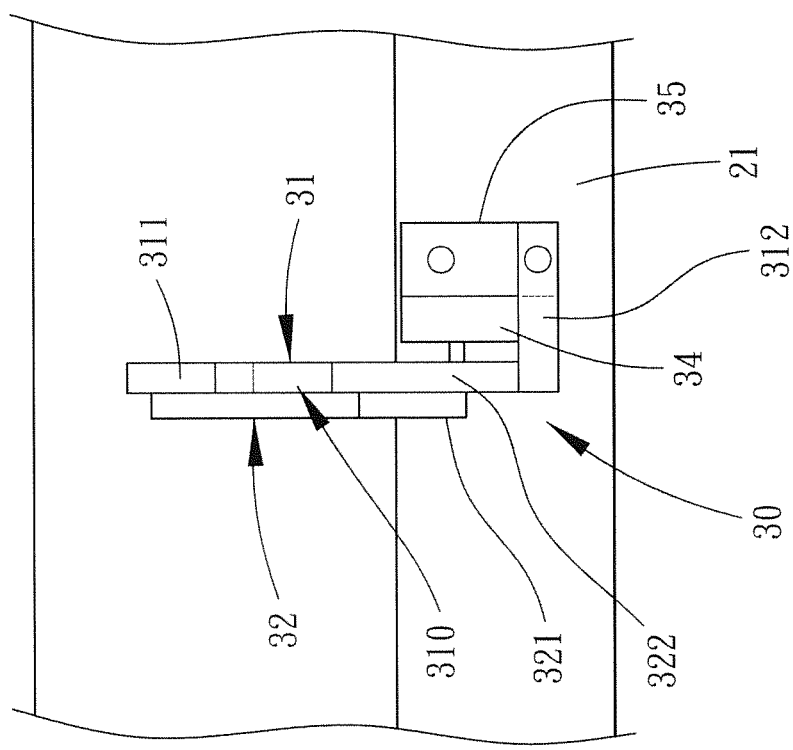
FIG. 7 is a schematic top view of FIG. 6.
Figure 8:
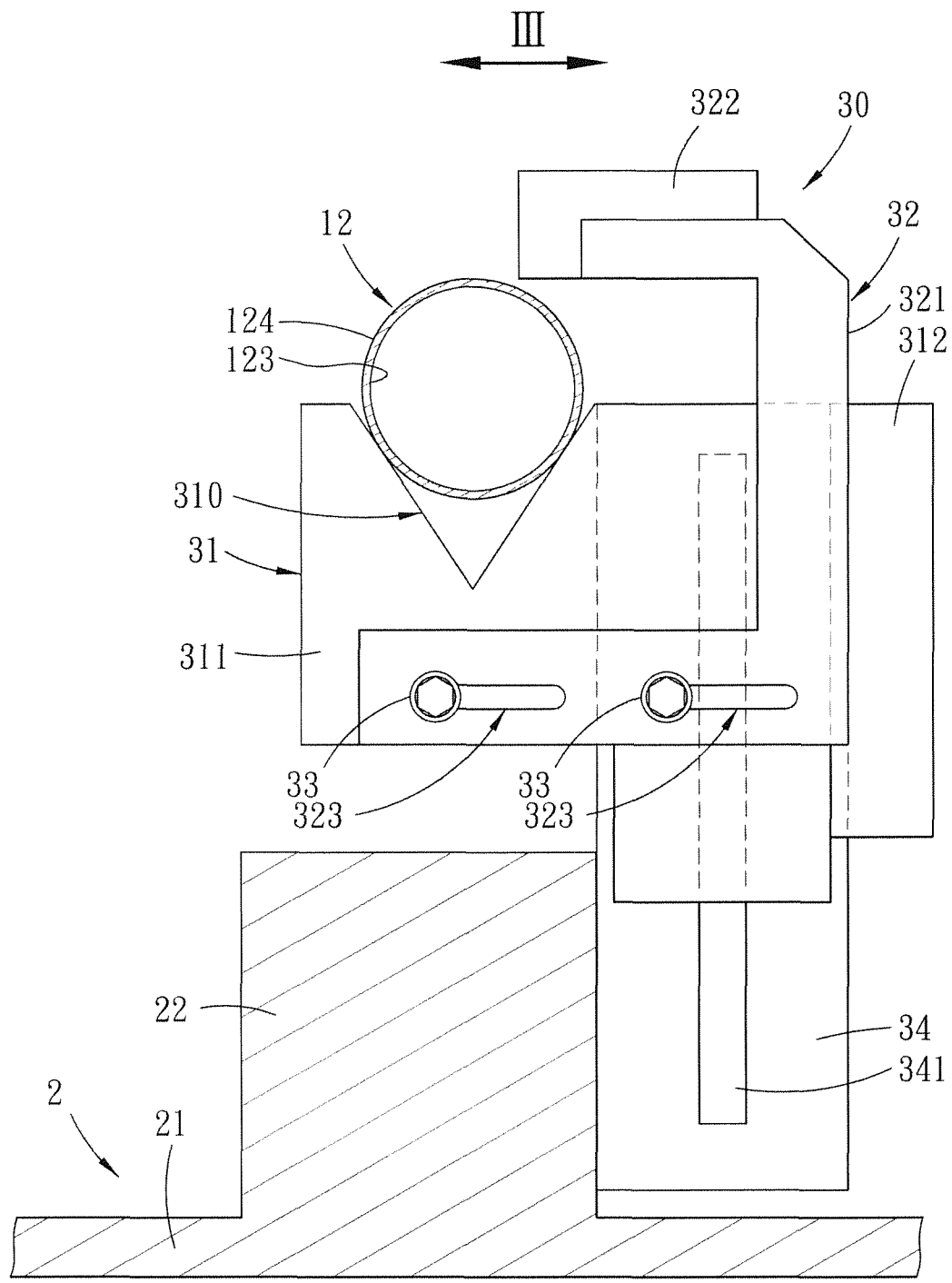
FIG. 8 is a partly sectional view of the first preferred embodiment, illustrating the holding assembly at an original position.

Referring to FIGS. 6 to 8, in combination with FIG. 4, in this embodiment, the holding device 3 includes two holding assemblies 30 disposed on the protruding seat 22 and spaced apart along the front-rear direction (I). Each holding assembly 30 includes a positioning plate 31 defining a positioning groove 310 for accommodating the tubular body 12. The positioning groove 310 has a V-shaped cross section. Through the V-shaped cross section of the positioning groove 310, the tubular body 12 can be positioned stably on the positioning groove 310 and rocking of the tubular body 12 can be prevented.

Figure 9:
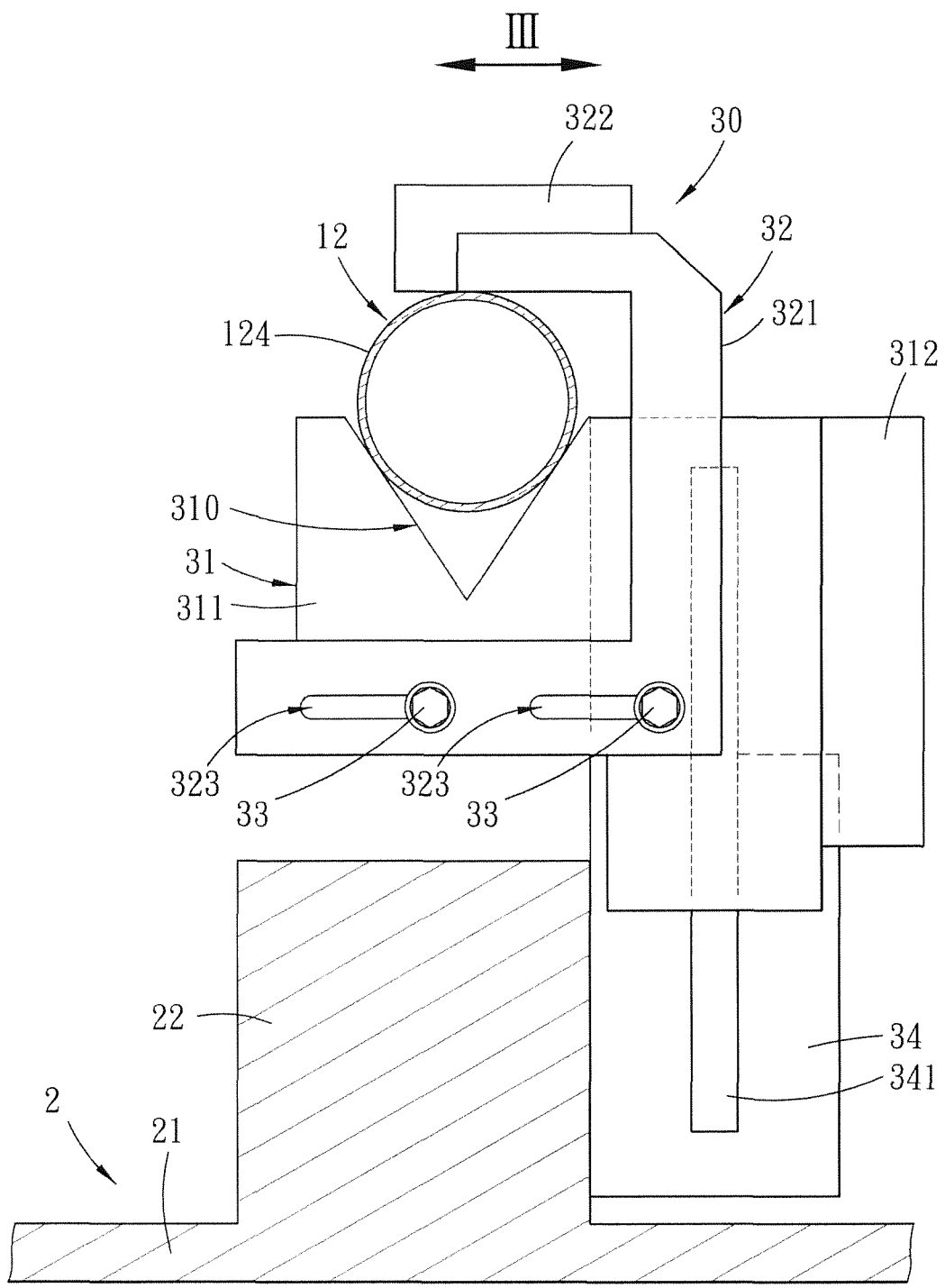
FIG. 9 is a view similar to FIG. 8, but illustrating the holding assembly at a pressing position.

Furthermore, in order to stably position the tubular body 12 in the positioning groove 310 and to simultaneously drive movement of the tubular body 12 between the default height position and the pressed position, each holding assembly 30 further includes a press plate 32 that is connected to and slidable relative to the positioning plate 31 in a left-right direction (III) (see FIG. 5) and between an original position and a pressing position. The press plate 32 is manually operated to slide relative to the positioning plate 31. In the original position, as shown in FIG. 8, the press plate 32 is spaced apart from the outer surface 124 of the tubular body 12. In the pressing position, as shown in FIG. 9, the press plate 32 presses a top end of the outer surface 124 of the tubular body 12. At this state, each holding assembly 30 can stably move the tubular body 12 between the default height position and the pressed position and can prevent the tubular body 12 from separating from the positioning groove 310.

With reference to FIGS. 6 to 9, specifically, the press plate 32 includes a U-shaped press plate body 321, and a press member 322 disposed on the press plate body 321. The press plate body 321 is formed with two elongated guide slots 323 that are proximate to a bottom end thereof and that are spaced apart in the left-right direction (III). Each elongated guide slot 323 extends in the left-right direction (III). The holding assembly 30 further includes two fasteners 33 that respectively fasten through the elongated guide slots 323 and that are secured to the positioning plate 31. Through cooperation of the fasteners 33 and the elongated guide slots 323, the press plate 32 is limited to slide relative to the positioning plate 31 only in the left-right direction (III). It should be noted that the number of the fasteners 33 and the number of the elongated guide slots 323 may be modified to one of each which may similarly achieve the aforesaid result. The press member 322 is secured to a top end of the press plate body 321, for example, by a screw-fastening method. The press member 322 is made of a plastic material, for example, Teflon (PTFE), and is used to press the top end of the outer surface 124 of the tubular body 12. Because Teflon is soft and has a low coefficient of friction, friction between the press member 322 and the outer surface 124 of the tubular body 12 can be reduced during movement of the press plate 32 from the original position to the pressing position to thereby prevent the press member 322 from scratching or abrading the outer surface 124 of the tubular body 12.

Additionally, each holding assembly 30 further includes a fixed post 34 and a first pneumatic cylinder 35. The fixed post 34 is affixed to one side of the protruding seat 22, for example, by a screw-fastening method. The positioning plate 31 includes a first plate portion 311, and a second plate portion 312 perpendicularly connected to the first plate portion 311. The first plate portion 311 is formed with the positioning groove 310, and is connected to the press plate body 321 through the fasteners 33. The first plate portion 311 is slidably connected to a slide rail 341 of the fixed post 34. The slide rail 341 is elongated, and extends in the up-down direction (II), as shown in FIG. 6. The first pneumatic cylinder 35 is disposed on a side of the fixed post 34 that is opposite to the slide rail 341, is connected to the second plate portion 312 of the positioning plate 31, and drives movement of the positioning plate 31 and the press plate 32 in the up-down direction (II) to move the tubular body 12 between the default height position and the pressed position.

Figure 10:
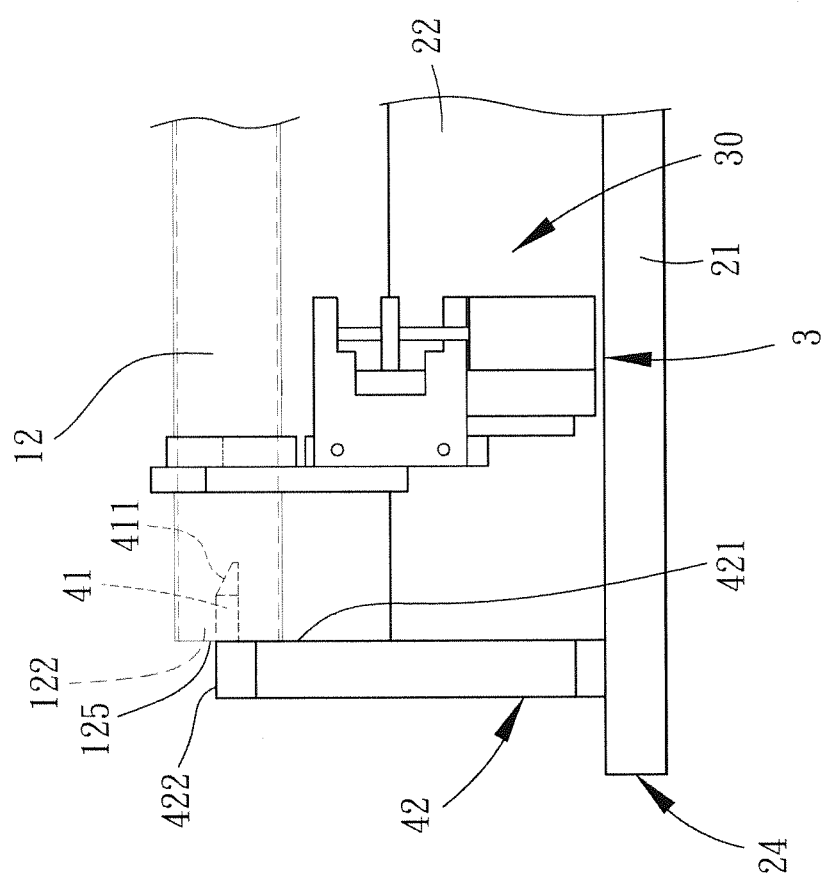
FIG. 10 is an enlarged fragmentary schematic view of FIG. 4, illustrating a detailed structure of a supporting arm.
Figure 11:
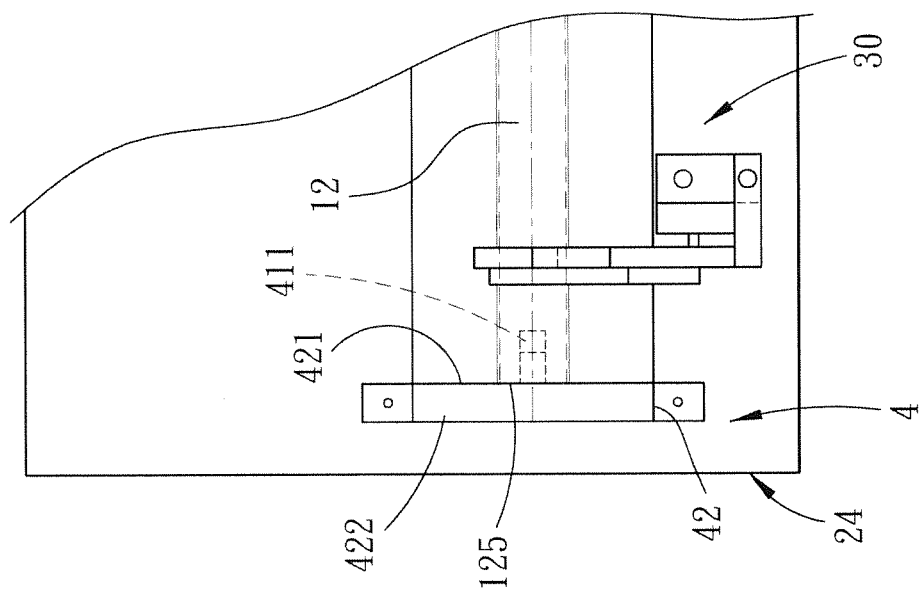
FIG. 11 is a schematic top view of FIG. 10.

As shown in FIGS. 4, 10, and 11, the supporting device 4 further includes a stop plate 42 fixed to the base plate 21 of the base 2, for example, by a screw-fastening method, and located at a rear end of the protruding seat 22. The stop plate 42 has a front stop surface 421 and a top surface 422. The front stop surface 421 is used to stop an open end 125 of the tubular body 12 having the second opening 122 to limit a rearward movement of the tubular body 12. The supporting arm 41 protrudes frontwardly from the front stop surface 421, and is flush with the top surface 422. When the open end 125 of the tubular body 12 abuts against the front stop surface 421, the supporting arm 41 extends into the tubular body 12 through the second opening 122.

Figure 12:
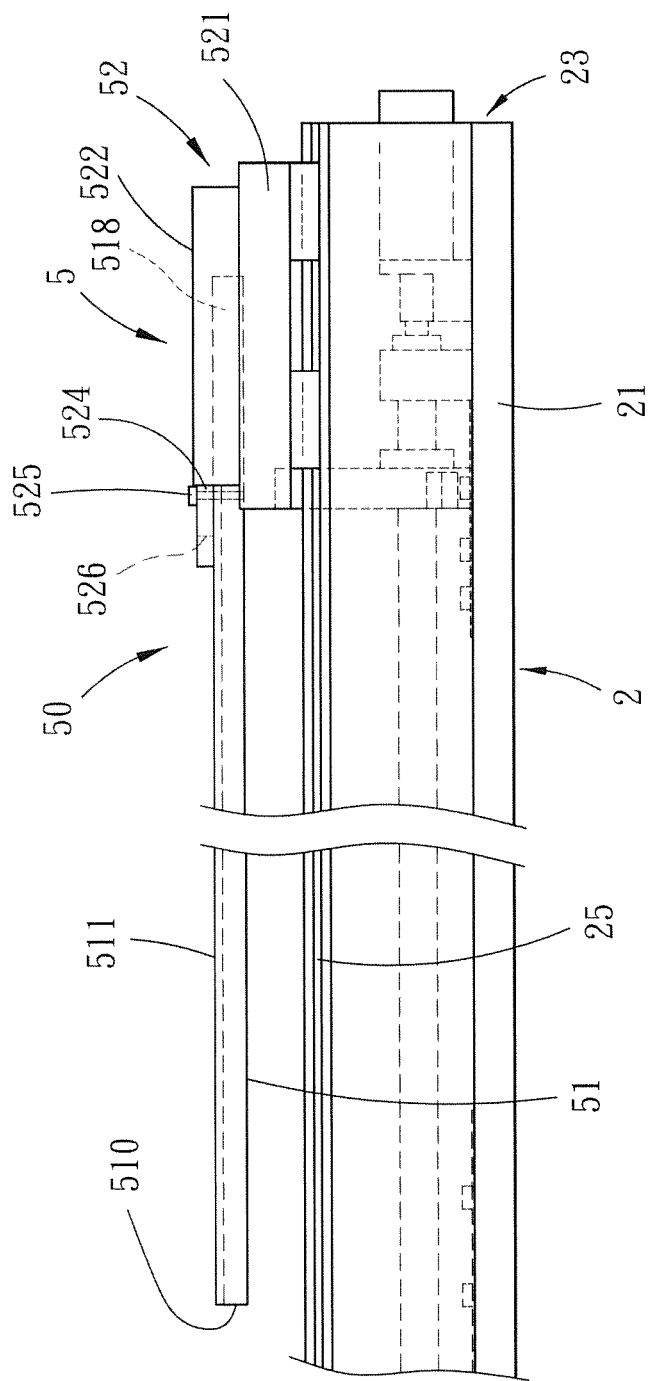
FIG. 12 is an enlarged fragmentary schematic view of FIG. 2, illustrating a detailed structure of a conveying device.
Figure 13:
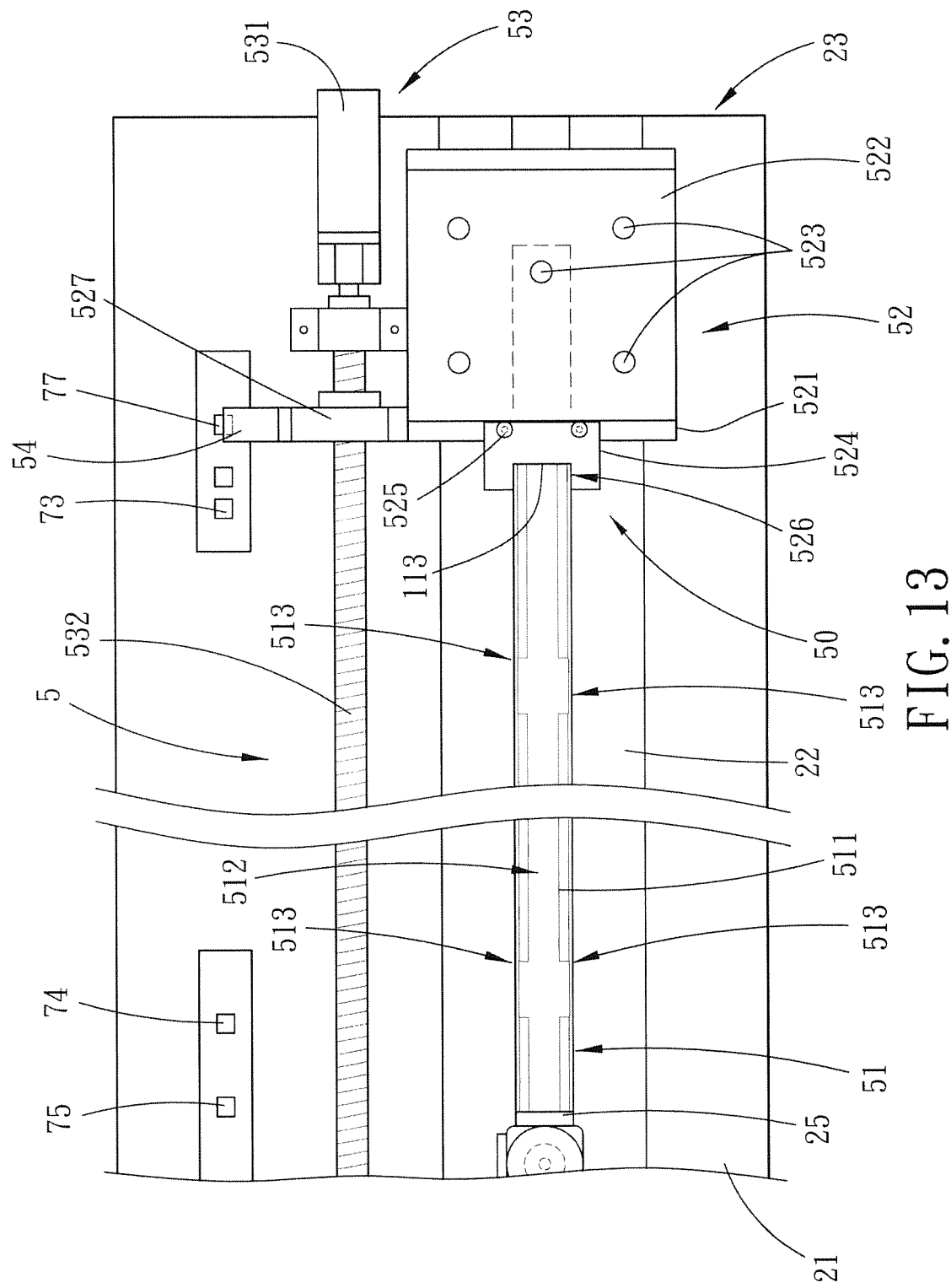
FIG. 13 is a schematic top view of FIG. 12.
Figure 14:
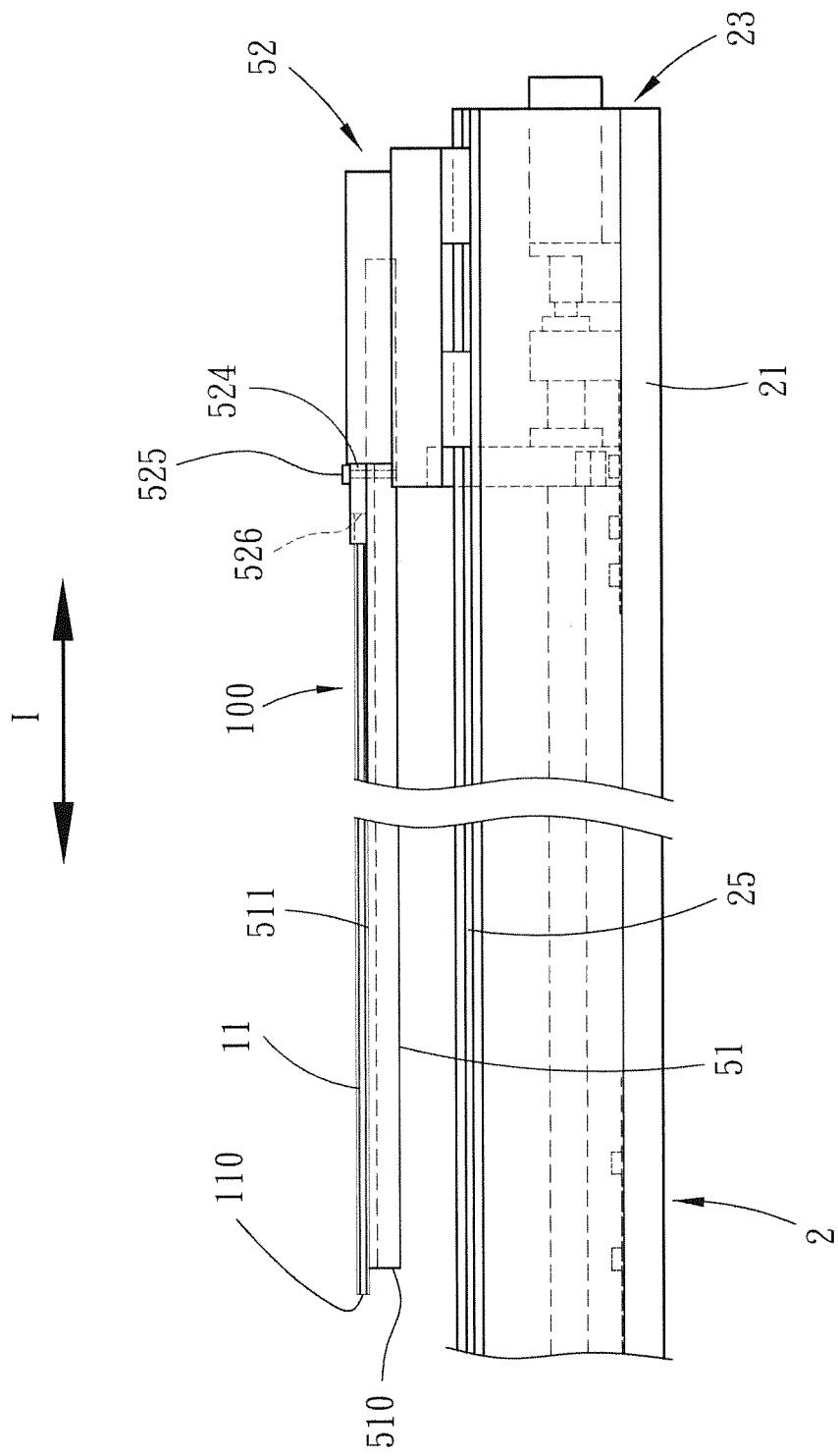
FIG. 14 is an enlarged fragmentary schematic view of FIG. 4, illustrating a heat dissipation substrate of the elongated module being engaged to a positioning groove of a positioning plate.
Figure 15:
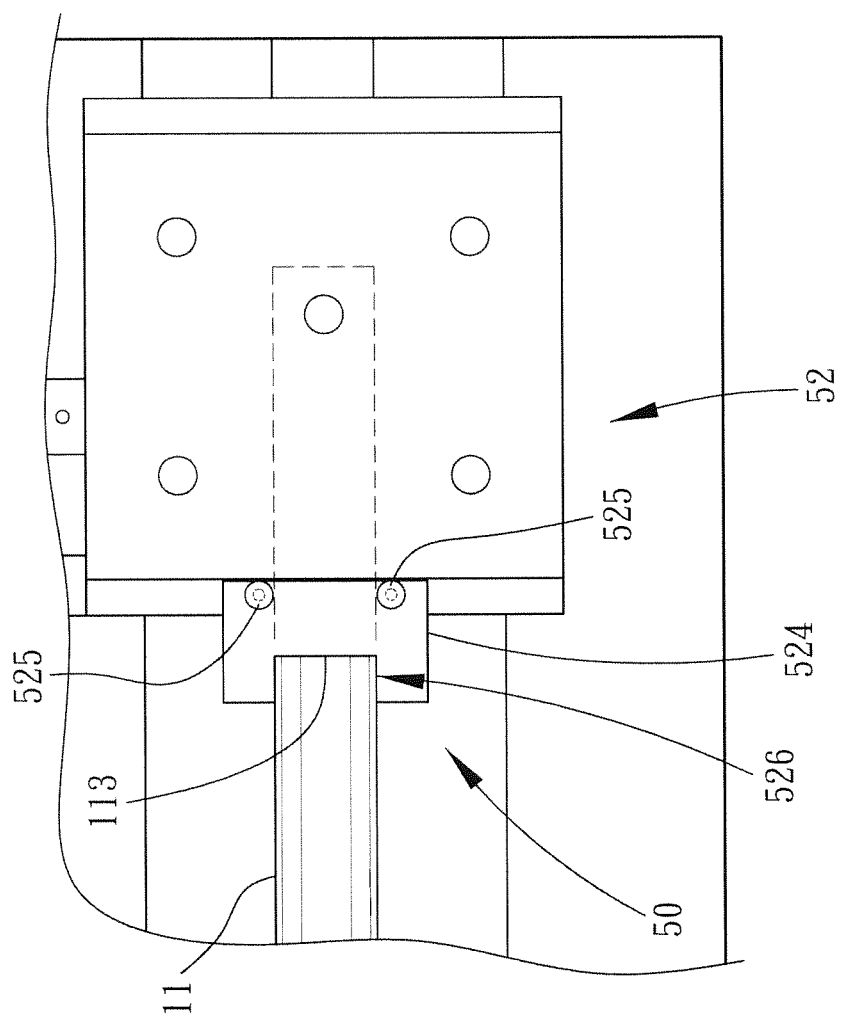
FIG. 15 is an enlarged fragmentary schematic top view of FIG. 14.

Referring to FIGS. 12 and 13, the conveying assembly 50 further includes a slide member 52 connected to the cantilever 51 and slidably connected to the slide rail 25 of the base 2. The slide member 52 includes a lower plate 521 connected to the slide rail 25, and an upper plate 522 secured atop the lower plate 521. The cantilever 51 extends in the front-rear direction (I) (see FIG. 4). The lower plate 521 and the upper plate 522 cooperatively clamped therebetween a front end portion 518 of the cantilever 51. The upper plate 522 is fixed to the lower plate 521 by using a plurality of screws 523. One of the screws 523 simultaneously fixes the upper plate 522 and the front end portion 518 of the cantilever 51 to the lower plate 521. Through this, the cantilever 51 can be stably connected to the slide member 52 in a suspended state.

As shown in FIGS. 12 to 15, the heat dissipation substrate 11 extends in the front-rear direction (I), and the slide member 52 further includes a positioning plate 524 pressed abuttingly against the cantilever 51 and secured to the lower plate 521 in proximity to a rear end thereof by two screws 525. The positioning plate 524 is formed with a positioning groove 526 for receiving a front end 113 of the heat dissipation substrate 11. Through this, the heat dissipation substrate 11 can be positioned on the cantilever 51 with a rear end 110 thereof extending beyond a rear end 510 of the cantilever 51 and the front end 113 thereof positioned in the positioning groove 526.

The supporting arm 41 includes a guide inclined face 411 (see FIG. 2) that inclines frontwardly and downwardly. When the cantilever 51 is moved to the extended position, the cantilever 51 and the heat dissipation substrate 11 extend into the tubular body 12, and the rear end 110 of the heat dissipation substrate 11 is pushed upward by the guide inclined face 411 so as to abut against a top end of the supporting arm 41 and to position on the top surface 422 of the stop plate 42 (see FIG. 26). Thus, the heat dissipation substrate 11, apart from being supported by the cantilever 51, has the rear end 110 supported by the supporting arm 41 and the stop plate 42 as well, so that the heat dissipation substrate 11 can be stably maintained at a horizontal state. Further, when the holding assemblies 30 are driven to move the tubular body 12 from the default height position to the pressed position, the inner surface 123 of the tubular body 12 is ensured to intimately press against and adhere to the joint surface 112 of the heat dissipation substrate 11.

It is worth mentioning that because the cantilever 51 is in a suspended state, if the heat dissipation substrate 11 depends solely on the cantilever 51 for support, when the holding assemblies 30 are driven to move the tubular body 12 downward to the pressed position, rear portions of the cantilever 51 and the heat dissipation substrate 11 are likely to bend slightly downward due to downward force of the tubular body 12, so that the inner surface 123 of the tubular body 12 cannot intimately adhere to the joint surface 112 of the heat dissipation substrate 11. Therefore, the present embodiment uses the cantilever 51, the supporting arm 41, and the stop plate 42 to cooperatively support the heat dissipation substrate 11 to ensure that the inner surface 123 of the tubular body 12 can intimately adhere to the joint surface 112 of the heat dissipation substrate 11 when the tubular body 12 is moved downward to the pressed position.

Figure 16:
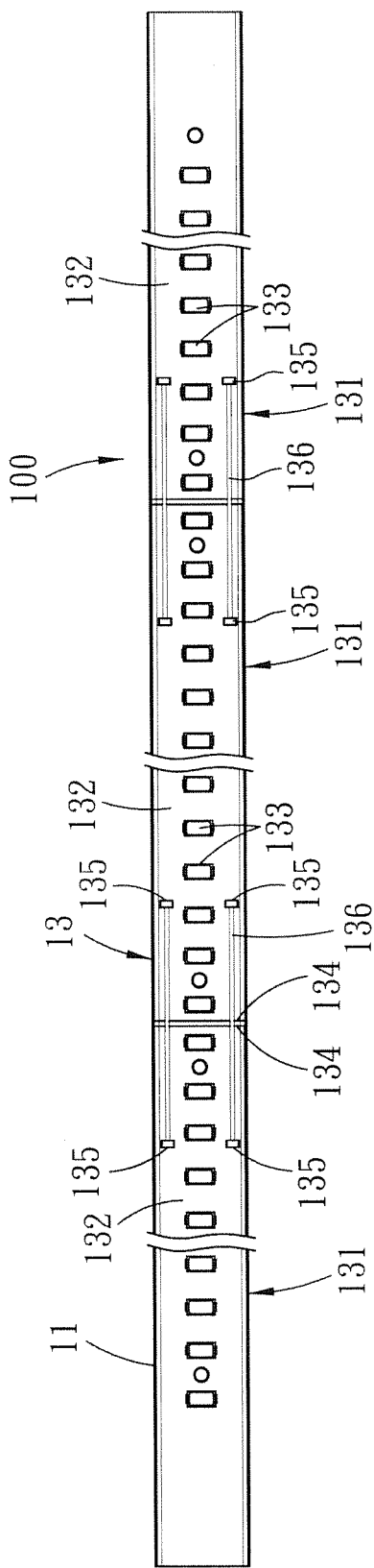
FIG. 16 is a schematic view of a light emitting module of the first preferred embodiment.
Figure 17:
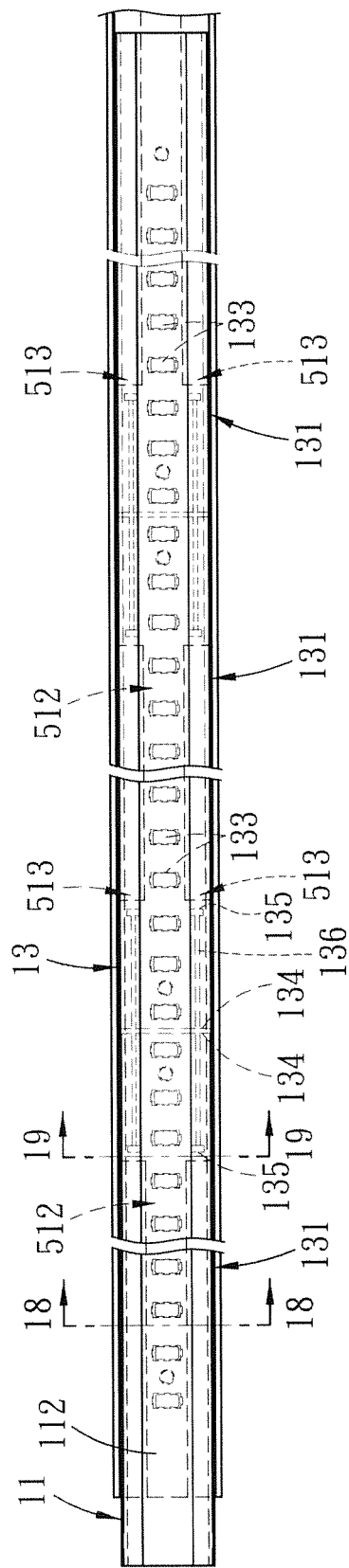
FIG. 17 is a schematic top view, illustrating the heat dissipation substrate and the light emitting module being disposed on the cantilever of the first preferred embodiment, and illustrating the LEDs of light emitting unit being received in a first receiving groove, the electrical connector being received in a second receiving groove.
Figure 18:
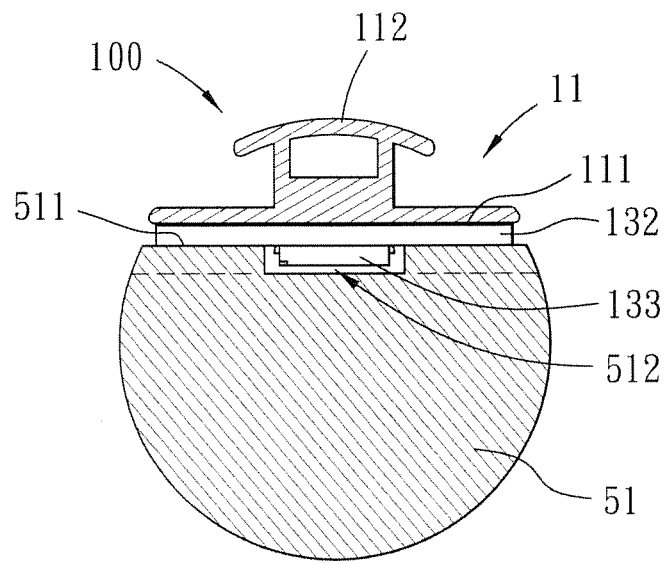
FIG. 18 is a sectional view taken along line 18-18 of FIG. 17.
Figure 19:
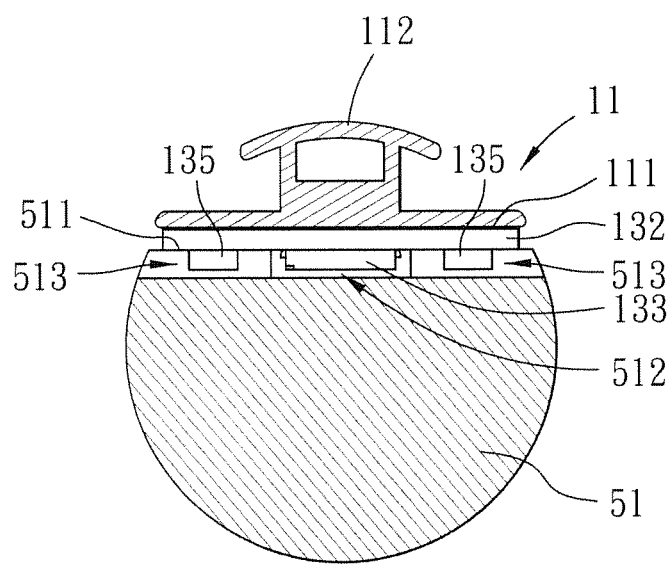
FIG. 19 is a sectional view taken along line 19-19 of FIG. 17.

As shown in FIGS. 1 and 16, the elongated module 100 of this embodiment further includes a light emitting module 13 disposed on the plate surface 111 of the heat dissipation substrate 11. The light emitting module 13 includes three light emitting units 131 that are arranged spaced apart from each other along the length of the heat dissipation substrate 11. Each light emitting unit 131 includes a rectangular circuit board 132 mounted on the plate surface 111, and a plurality of light emitting diodes (LEDs) 133 disposed in the middle of the circuit board 132 and arranged spaced apart from each other along the length of the circuit board 132. Every two adjacent ones of the circuit boards 132 of the light emitting units 131 have adjacent short sides 134 spaced apart from each other.

A middle one of the light emitting units 131 includes two pairs of electrical connectors 135 protruding from the circuit board 132 thereof. Each pair of the electrical connectors 135 are spaced apart from each other in the left-right direction (III) and are proximate to a corresponding short side 134 of the circuit board 132. Each of a front and a rear ones of the light emitting units 131 includes a pair of electrical connectors 135 protruding from the corresponding circuit board 132. The pairs of the electrical connectors 135 of the front and rear light emitting units 131 correspond in position with the pairs of the electrical connectors 135 of the middle light emitting unit 131. Each pair of the electrical connectors 135 of the middle light emitting unit 131 are electrically and respectively connected to the pair of the electrical connectors 135 of the corresponding front or rear light emitting unit 131 by a pair of bonding wires 136, thereby electrically connecting the circuit boards 132 of the front and rear light emitting units 131.

As shown in FIGS. 13, 17, 18, and 19, because the LEDs 133 and the electrical connectors 135 of each light emitting unit 131 protrude from the corresponding circuit board 132, a surface of each light emitting unit 131 that is opposite to the plate surface 111 of the heat dissipation substrate 11 is undulated. In order for the cantilever 51 to stably hold the light emitting module 13 and the heat dissipation substrate 11 while preventing friction between the cantilever 51 and the protruding portions (i.e., the LEDs 133 and the electrical connectors 135) of the light emitting units 131, in this embodiment, the cantilever 51 has a holding surface 511. The holding surface 511 is formed with a first receiving groove 512 that is indented inwardly from the center thereof and that extends in a direction parallel to the length of the cantilever 51, and two pairs of second receiving grooves 513 spaced apart in the front-rear direction (II). Each pair of the second receiving grooves 513 communicate with left and right sides of the first receiving groove 512. The first receiving groove 512 is used to accommodate the LEDs 133 of the light emitting units 131. Each second receiving groove 513 is used to accommodate two electrical connectors 135 and the bonding wire 136 connected between the electrical connectors 135. Through this, the circuit board 132 of each light emitting unit 131 can abut intimately against the holding surface 511 of the cantilever 51, so that the cantilever 51 can stably hold the light emitting module 13 and the heat dissipation substrate 11 while preventing friction between the cantilever 51 and the protruding portions of the light emitting units 131.

It should be noted that the number of the light emitting units 131 and the configurations of the LEDs 133, the electrical connectors 135, and the bonding wires 136 may be modified as necessary and should not be limited to the above disclosed embodiment. Because the cantilever 51 can be detachably connected between the lower plate 521 and the upper plate 522, the cantilever 51 may be replaced to correspond to the modified number of the light emitting units 13 and the modified configurations of the LEDs 133, the electrical connectors 135, and the bonding wires 136, so that the first and second receiving grooves 512, 513 of the cantilever 51 can coordinate with the LEDs 133, the electrical connectors 135, and the bonding wires 136 of the light emitting module 13, thereby ensuring intimate abutment of the circuit board 132 of each light emitting unit 131 with the holding surface 511 of the cantilever 51. Further, in this embodiment, the elongated module 100 may only include the heat dissipation substrate 11 and without having the light emitting module 13. In this case, the cantilever 51 may omit the first and second receiving grooves 512, 513, so that the plate surface 111 of the heat dissipation substrate 11 is in direct contact with the holding surface 511 of the cantilever 51.

As shown in FIGS. 2, 3, and 4, the conveying device 5 further includes a drive mechanism 53 disposed on the base plate 21 to drive sliding movement of the slide member 52 of the conveying assembly 50. The drive mechanism 53 includes a motor 531, and a threaded shaft 532 that is driven to rotate by the motor 531 and that extends in the front-rear direction (I). The slide member 52 further includes a side plate 527 secured to one side of the lower plate 521 and threadedly connected to the threaded shaft 532. When the motor 531 drives the threaded shaft 532 to rotate, the threaded shaft 532, in turn, drives the side plate 527 to move back and forth in the front-rear direction (I).

The assembling machine 200 further includes a control device 7 disposed on the base 2. The control device 7 includes a control box 71 disposed on the base plate 21, and a control unit 72 disposed on the control box 71.

The dispensing device 6 further includes a holding frame 62 fixed to a front side of the control box 71, and a dispensing control unit 63 disposed atop the control box 71. The dispenser 61 is disposed on and held by the holding frame 62, has a needle-like structure, and contains adhesive 60 (see FIG. 22). The dispensing control unit 63 controls the manner in which the dispenser 61 dispenses the adhesive 60 (i.e., at intervals or continuously), and controls air pressure sent to the dispenser 61 so that the pressurized air can push the adhesive 60 to flow down and out of the dispenser 61. The control unit 72 is electrically coupled to and controls the dispensing control unit 63 so that the dispensing control unit 63 can drive the dispenser 61 to dispense the adhesive 60.

The control device 7 further includes a first sensor 73 disposed on the base plate 21 and electrically coupled to the control unit 72. The conveying assembly 50 further includes a plate 54 disposed on the side plate 527 of the slide member 52. When the plate 54 and the first sensor 73 correspond in position, the first sensor 73 generates and sends a signal to the control unit 72, which then controls the dispenser 61 to start dispensing the adhesive 60. It should be noted that the plate 54 may be, for example, a sensor board having a chip or a circuit. The control device 7 further includes a second sensor 74 disposed on the base plate 21 and electrically coupled to the control unit 72. The second sensor 74 is spaced apart from and is disposed rearwardly of the first sensor 73. When the plate 54 and the second sensor 79 correspond in position, the second sensor 74 generates and sends a signal to the control unit 72, which then controls the dispensing unit 61 to stop dispensing the adhesive 60. Through the arrangement of the first and second sensors 73, 79, the dispenser 61 can dispense the adhesive 60 onto the joint surface 112 of the heat dissipation substrate 11 within a predetermined length (i.e., the distance between the first and second sensors 73, 74).

The motor 531 of the drive mechanism 53 is electrically coupled to the control unit 72. The control device 7 further includes a rear limit switch 75 disposed on the base plate 21 and electrically coupled to the control unit 72. The rear limit switch 75 is spaced apart from and is disposed rearwardly of the second sensor 74. When the plate 54 and the rear limit switch 75 correspond in position, the rear limit switch 75 generates and sends a signal to the control unit 72, which then controls the motor 531 to stop actuation so as to position the cantilever 51 at the extended position and to control the holding assemblies 30 to move downwardly the tubular body 12 to the pressed position.

The control device 7 further includes a timer 76 disposed within the control box 71 and electrically connected to the control unit 72. The timer 76 is used to measure a length of time that the holding assemblies 30 and the tubular body 12 are in the pressed position. When the length of time reaches a preset value that is preset by the timer 76, the timer 76 generates and sends a signal to the control unit 72, so that the control unit 72 controls the holding assemblies 30 to move upwardly to place the tubular body 12 back to the default height position. This can ensure that after the adhesive 60 between the joint surface 112 of the heat dissipation substrate 11 and the tubular body 12 is set, only then will the control unit 72 command the holding assemblies 30 to move the tubular body 12 back to the default height position, thereby preventing the tubular body 12 from separating from the heat dissipation substrate 11 due to unsolidified adhesive.

The control unit 72 controls actuation of the motor 531 so as to drive sliding movement of the conveying assembly 50 to thereby move the cantilever 51 back to the default position. The control device further includes a front limit switch 77 disposed on the base plate 21 at a position spaced apart from and forwardly of the first sensor 73 and electrically coupled to the control unit 72. When the plate 54 and the front limit switch 77 correspond in position, the front limit switch 77 generates and sends a signal to the control unit 72, which then controls the motor 53 to stop actuation to thereby position the conveying assembly 50 at the default position.

Figure 20:
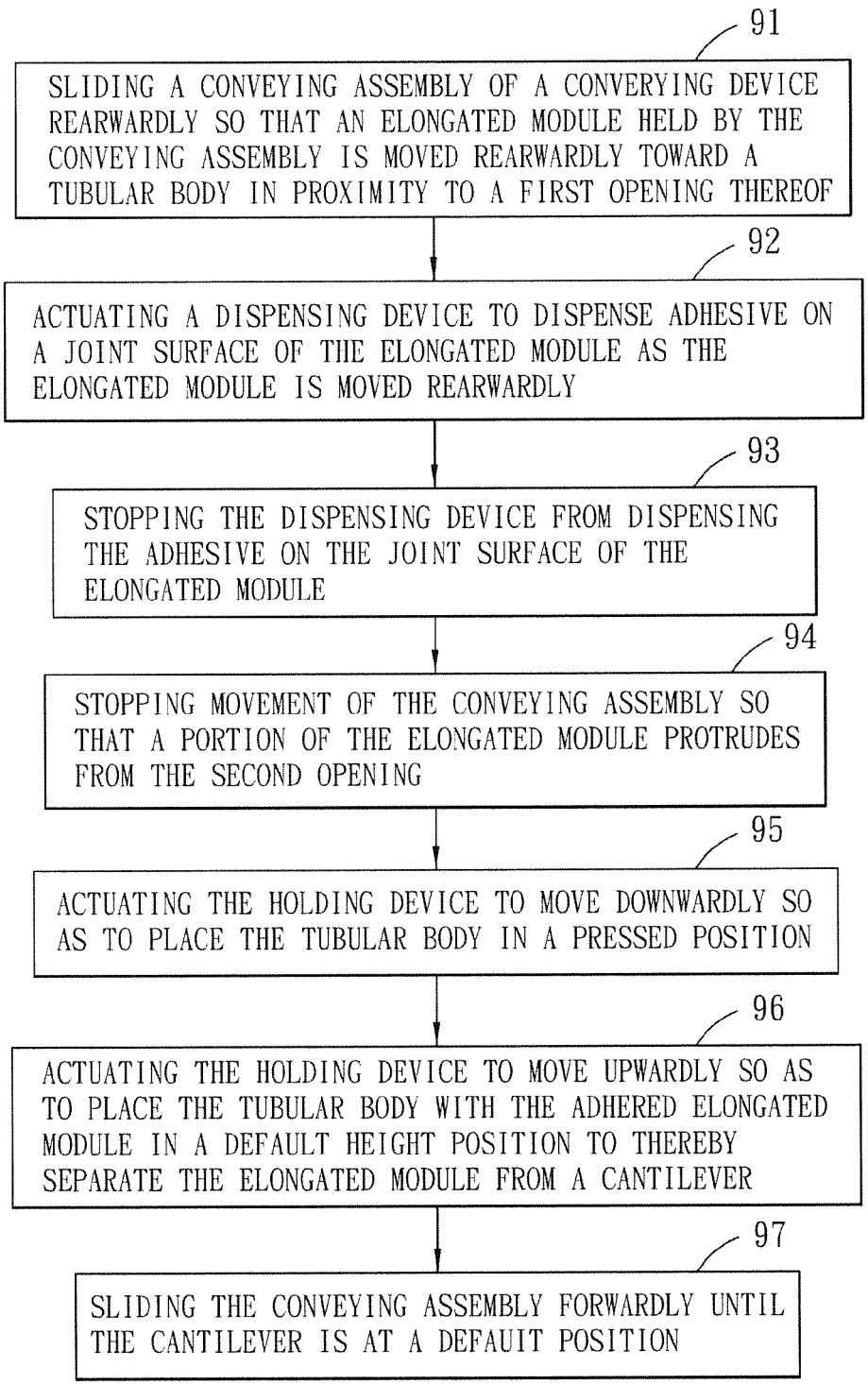
FIG. 20 is a flow chart, illustrating the steps involved in an assembling method according to the first preferred embodiment of the present invention.

Below is a detailed description of an assembling method of the assembling machine, as shown in FIGS. 4 and 20. FIG. 20 is a flow chart, illustrating the steps involved in the assembling method of the assembling machine according to this embodiment. The assembling method includes steps 91 to 97.

In step 91, the conveying assembly 50 of the conveying device 5 that holds the elongated module 100 is slid rearwardly along the front-rear direction (I), so that the elongated module 100 faces the first opening 121 of the tubular body 12 which is positioned on the holding device 3.

In step 92, the dispensing device 6 is actuated to dispense adhesive 60 onto the joint surface 112 of the elongated module 100 as the elongated module 100 is moved rearwardly. The cantilever 51 of the conveying assembly 50 drives the adhesive-coated elongated module 100 into the tubular body 12 through the first opening 121.

In step 93, the dispensing device 6 is stopped from dispensing the adhesive 60 onto the joint surface 112 of the elongated module 100.

In step 94, movement of the conveying assembly 50 is stopped so that a portion of the elongated module 100 protrudes from the second opening 122.

In step 95, the holding device 3 is actuated to move downwardly so as to place the tubular body 12 in the pressed position, in which the inner surface 123 of the tubular body 12 is pressed against and adhered to the joint surface 112 of the elongated module 100.

In step 96, the holding device 3 is actuated to move upwardly so as to place the tubular body 12 with the adhered elongated module 100 in the default height position to thereby separate the elongated module 100 from the cantilever 51.

Finally, in step 97, the conveying assembly 50 is actuated to slide forwardly until the cantilever 51 is located at the default position, in which the cantilever 51 is spaced apart from and is disposed in front of the first opening 121.

With reference to FIGS. 4, 8, 9, and 10, before step 91, the tubular body 12 is first placed in the positioning grooves 310 of the holding assemblies 30 such that the open end 125 of the tubular body 12 abuts against the front stop face 421 of the stop plate 42 and such that the supporting arm 41 extends into the tubular body 12 through the second opening 122. Next, the press plates 32 of the holding assembly 30 are slid along the left-right direction (III) to the pressing position shown in FIG. 9, where the press plate 32 presses against the top end of the outer surface 124 of the tubular body 12. Further, with reference to FIGS. 17, 13, and 19, the heat dissipation substrate 11 and the light emitting module 13 of the elongated module 100 are placed atop the cantilever 51, so that the LEDs 133 of each light emitting unit 131 are accommodated in the first receiving groove 512 and each pair of the electrical connectors 135 interconnected by a corresponding bonding wire 136 are accommodated in the corresponding second receiving groove 513 so that the circuit board 132 of each light emitting unit 131 can abut smoothly against the holding surface 511 of the cantilever 51. Additionally, with reference to FIGS. 14 and 15, the front end 113 of the heat dissipation substrate 51 is engaged with the positioning groove 526 so as to position the heat dissipation substrate 11 and the light emitting module 13 on the cantilever 51, and the rear end 110 of the heat dissipation substrate 51 partially protrudes beyond the rear end 510 of the cantilever 51.

Figure 21:
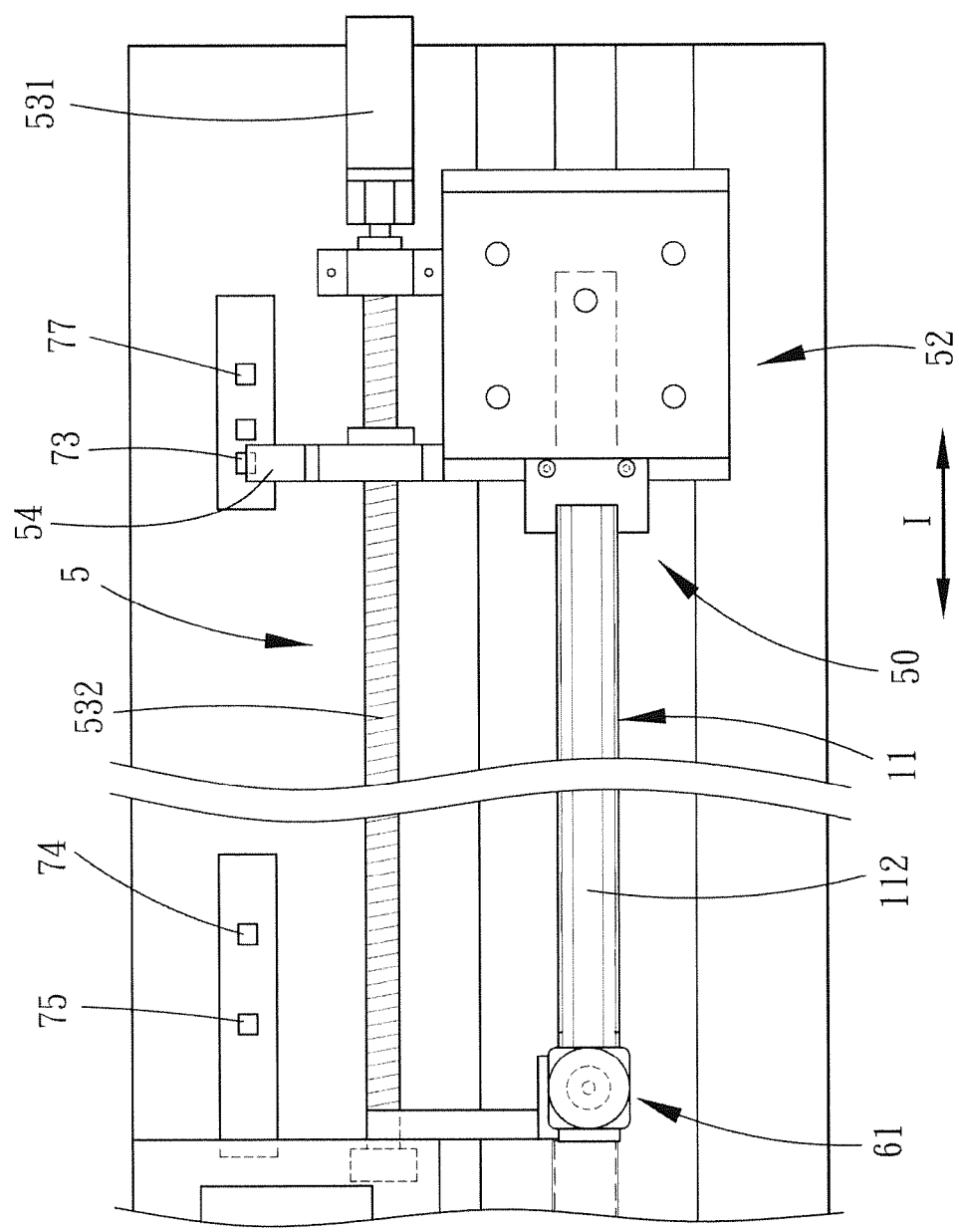
FIG. 21 is an enlarged fragmentary schematic top view of the first preferred embodiment, illustrating how a conveying assembly takes a plate to move to a position corresponding to a first sensor.

Referring to FIGS. 20 and 21, in combination with FIG. 4 and step 91, a start switch 70 of the control device 7 is pressed, so that the control unit 72 actuates the motor 531 of the drive mechanism 53, and the motor 531 then drives the threaded shaft 532 to rotate. Consequently, the conveying assembly 50 is driven by the threaded shaft 532 to slide rearwardly, so that the heat dissipation substrate 11 and the light emitting modules 13 of the elongated module 100 are moved toward near the first opening 121 of the tubular body 12.

Figure 22:
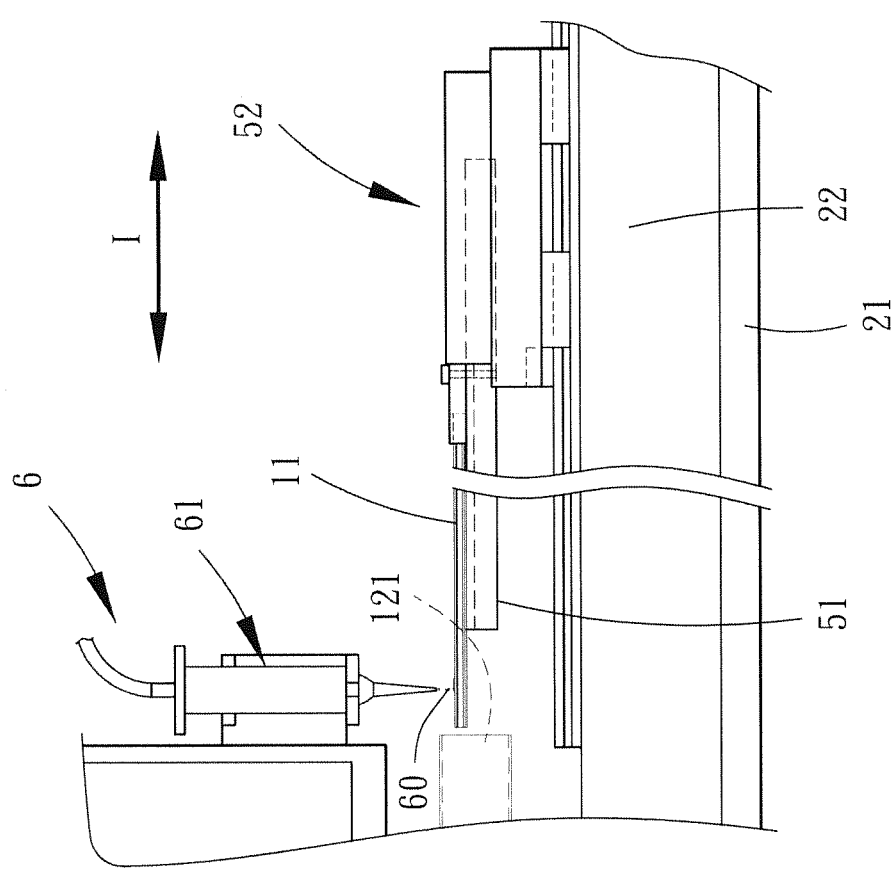
FIG. 22 is an enlarged fragmentary front view of the first preferred embodiment, illustrating how a dispensing device dispenses adhesive on a joint surface of the heat dissipation substrate.

When the conveying assembly 50 drives the plate 54 to move to a position corresponding to that of the first sensor 73, the first sensor 73 generates and sends a signal to the control unit 72. The control unit 72 then actuates the dispensing device 6 to carry out step 92. As shown in FIG. 22, the dispenser 61 of the dispensing device 6 dispenses the adhesive 60 onto the joint surface 112 of the heat dissipation substrate 11 as the elongated module 100 is continuously moved rearward into the tubular body 12, thereby coating the joint surface 112 with the adhesive 60. At this step, the dispensing control unit 63 may control the dispenser 61 to dispense the adhesive 60 at intervals or continuously. Because the conveying assembly 50 continually slides rearward in the front-rear direction (I), the cantilever 51 carries the adhesive-coated heat dissipation substrate 11 into the tubular body 12 through the first opening 121.

Figure 23:
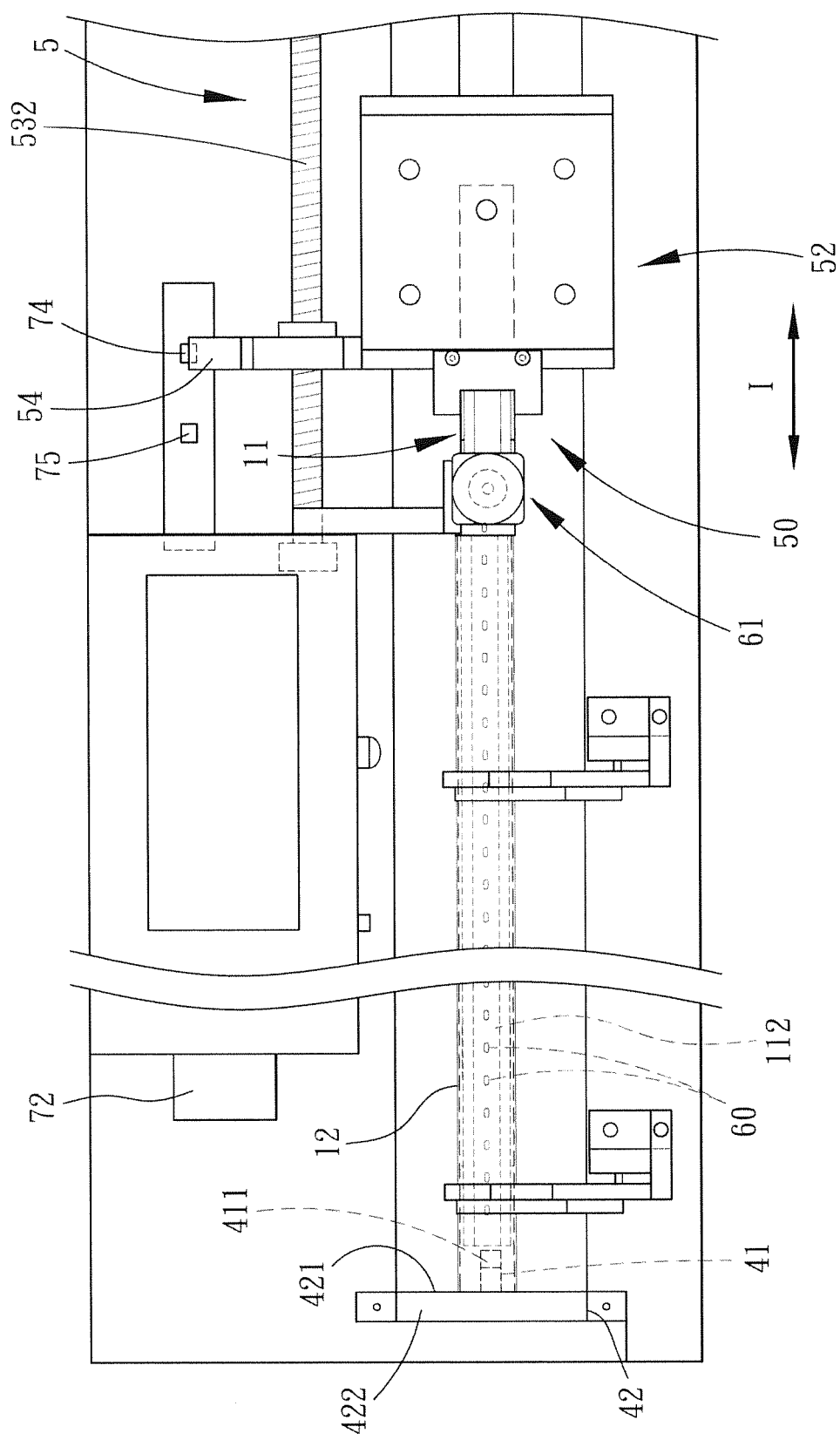
FIG. 23 is another enlarged fragmentary schematic top view of the first preferred embodiment, illustrating how the conveying assembly takes the plate to move to a position corresponding to a second sensor.
Figure 24:
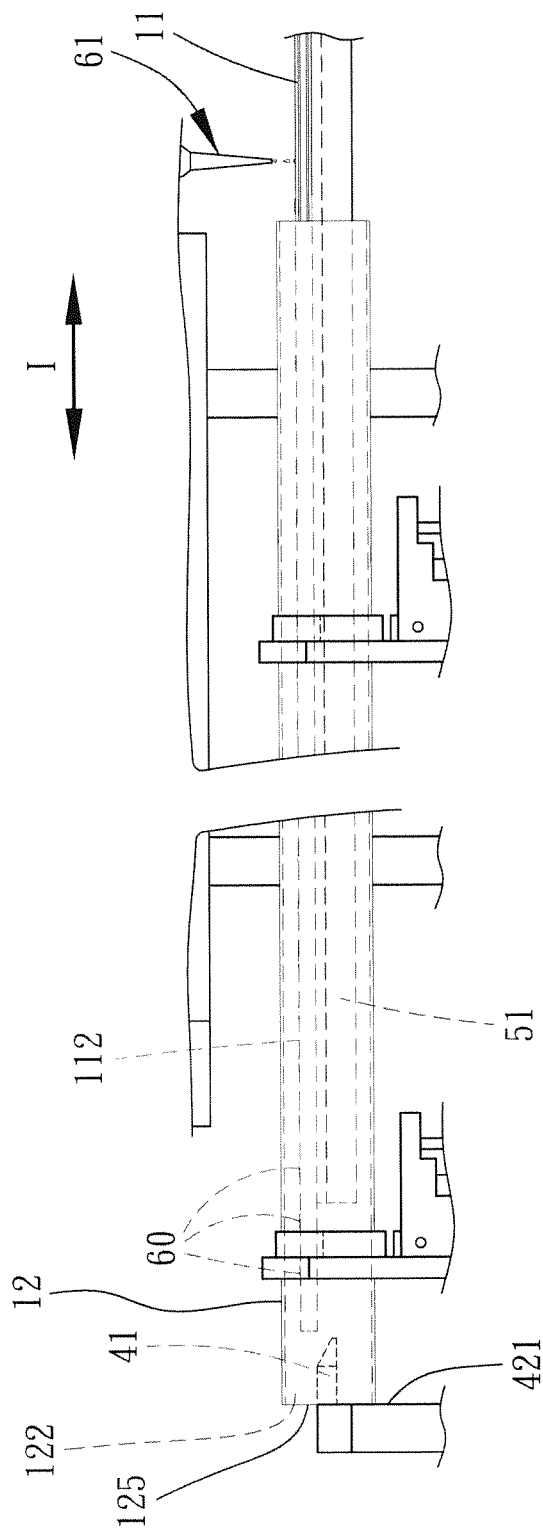
FIG. 24 is a fragmentary schematic front view of the first preferred embodiment, illustrating the dispensing device being stopped from dispensing the adhesive on the joint surface of the heat dissipation substrate.

Referring to FIGS. 23 and 24, in combination with FIG. 20, when the conveying assembly 50 drives the plate 54 to move to a position corresponding to that of the second sensor 74, the second sensor 74 generates and sends a signal to the control unit 72, which then controls the dispensing device 6 to perform step 93, where the dispenser 61 of the dispensing device 6 stops dispensing the adhesive 60 onto the joint surface 112.

Figure 25:
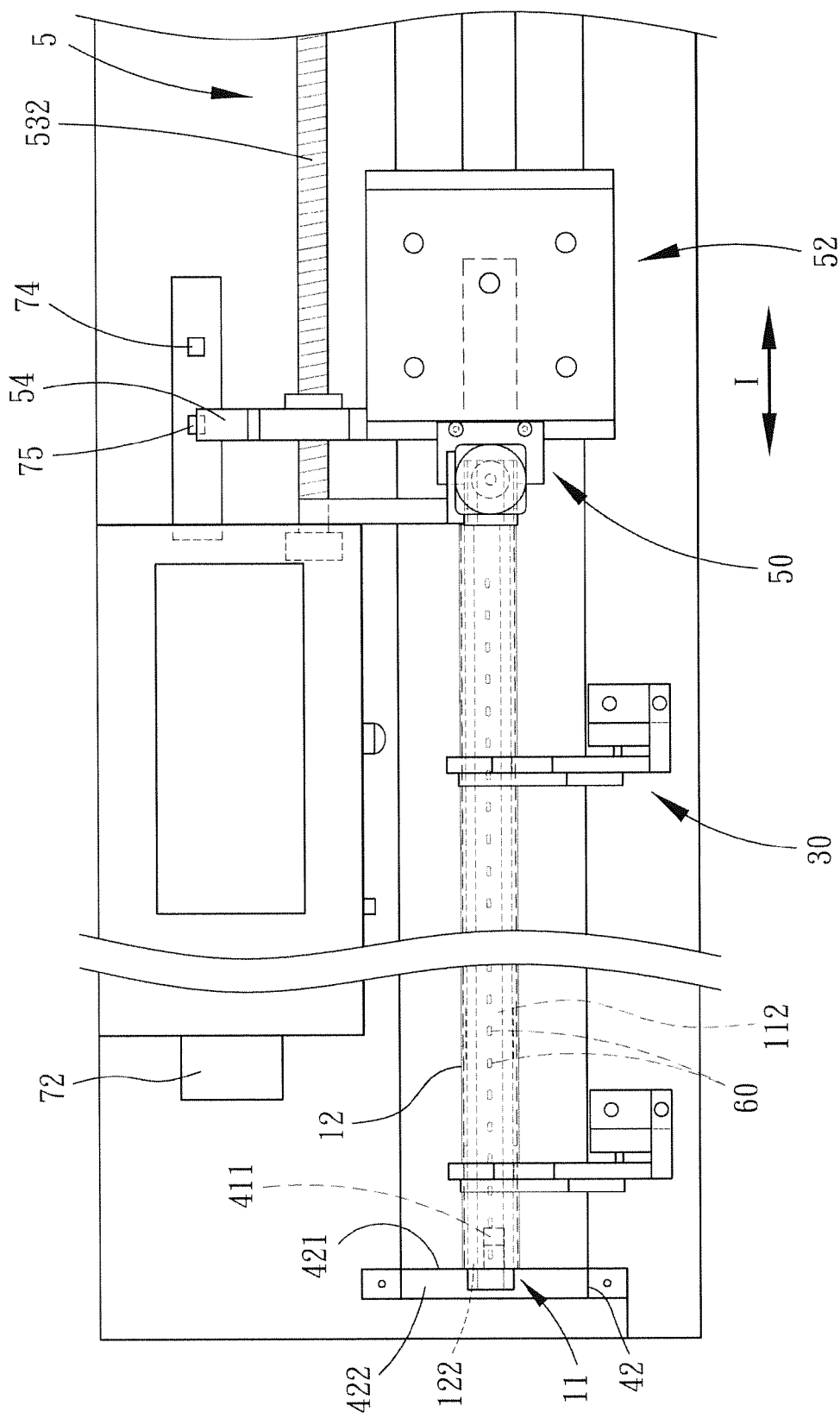
FIG. 25 is a view similar to FIG. 23, but illustrating the conveying assembly taking the plate to a position corresponding to a rear limit switch.
Figure 26:
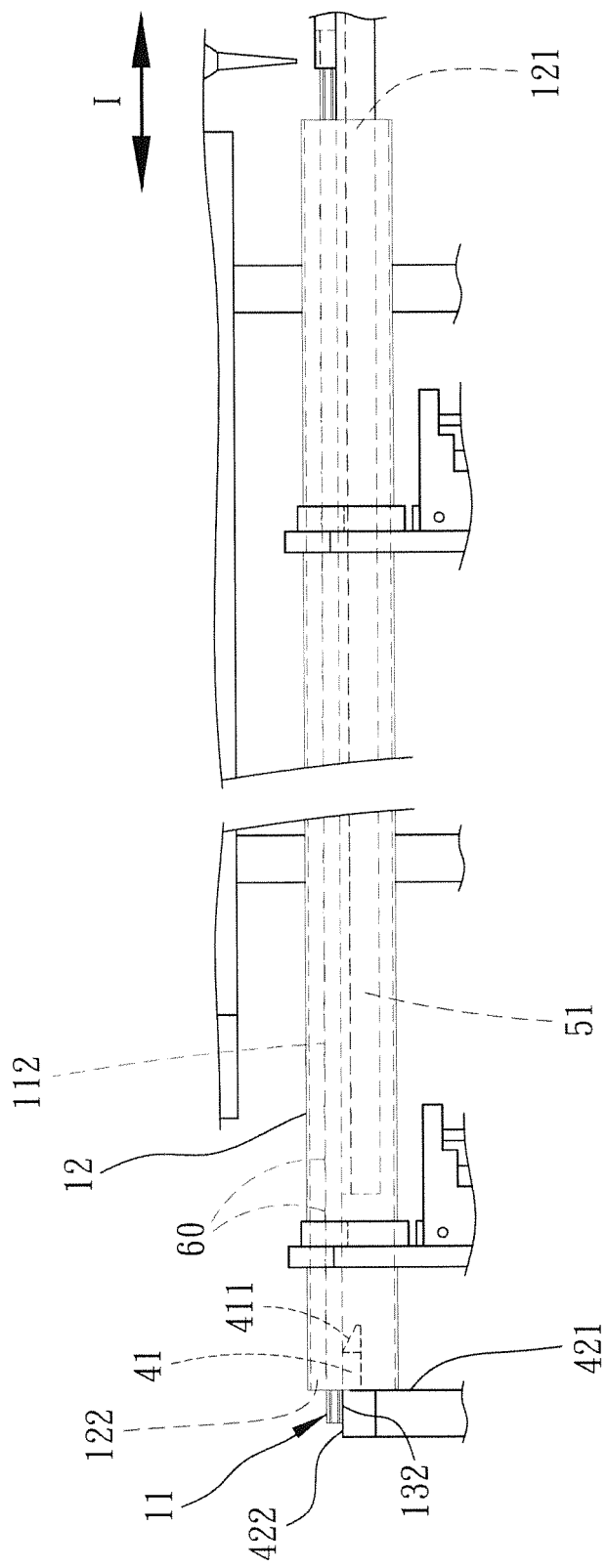
FIG. 26 is a view similar to FIG. 24, but illustrating the heat dissipation substrate protruding from a second opening of the tubular body.

Referring to FIGS. 25 and 26, in combination with FIG. 20 and step 94, when the cantilever 51 along with the heat dissipation substrate 11 and the light emitting module 13 is moved until the circuit board 132 of the rear light emitting unit 131 that partially protrudes out of the rear end 510 of the cantilever 51 abuts against the guide inclined face 411 of the supporting arm 41, the guide inclined face 411 pushes the circuit board 132 and the heat dissipation substrate 11 upward so as to move the circuit board 132 to abut against the top end of the supporting arm 41 and the top surface 422 of the stop plate 42. When the conveying assembly 50 drives the plate 54 to move to a position corresponding to that of the rear limit switch 75, the rear limit switch 75 generates and sends a signal to the control unit 72, which then controls the motor 531 (see FIG. 21) to stop actuation. At this time, the movement of the conveying assembly 50 is stopped, the heat dissipation substrate 11 is positioned such that a portion thereof protrudes from the second opening 122 of the tubular body 12, and the circuit board 132 of the rear light emitting unit 131 abuts against the top end of the supporting arm 41 and the top surface 422 of the stop face 42.

Referring to FIGS. 27 and 28, in combination with FIG. 20 and step 95, the control unit 72 actuates the first pneumatic cylinder 35 (see FIG. 6) of each holding assembly 30 to drive the positioning plate 31 and the press plate 32 of the respective holding assembly 30 to move downward along the up-down direction (II). The positioning plate 31 and the press plate 32 of each holding assembly 30 then move the tubular body 12 downwardly to the pressed position shown in FIG. 28. At this time, the inner surface 123 of the tubular body 12 is pressed against the joint surface 112 so that the adhesive 60 coated on the joint surface 112 will adhere to the inner surface 123 of the tubular body 12. When the holding device 3 moves the tubular body 12 downwardly to the pressed position, the timer 76 (see FIG. 4) of the control unit 7 begins to keep track of the length of time that the tubular body 12 and the holding device 3 will remain in the pressed position.

Figure 29:
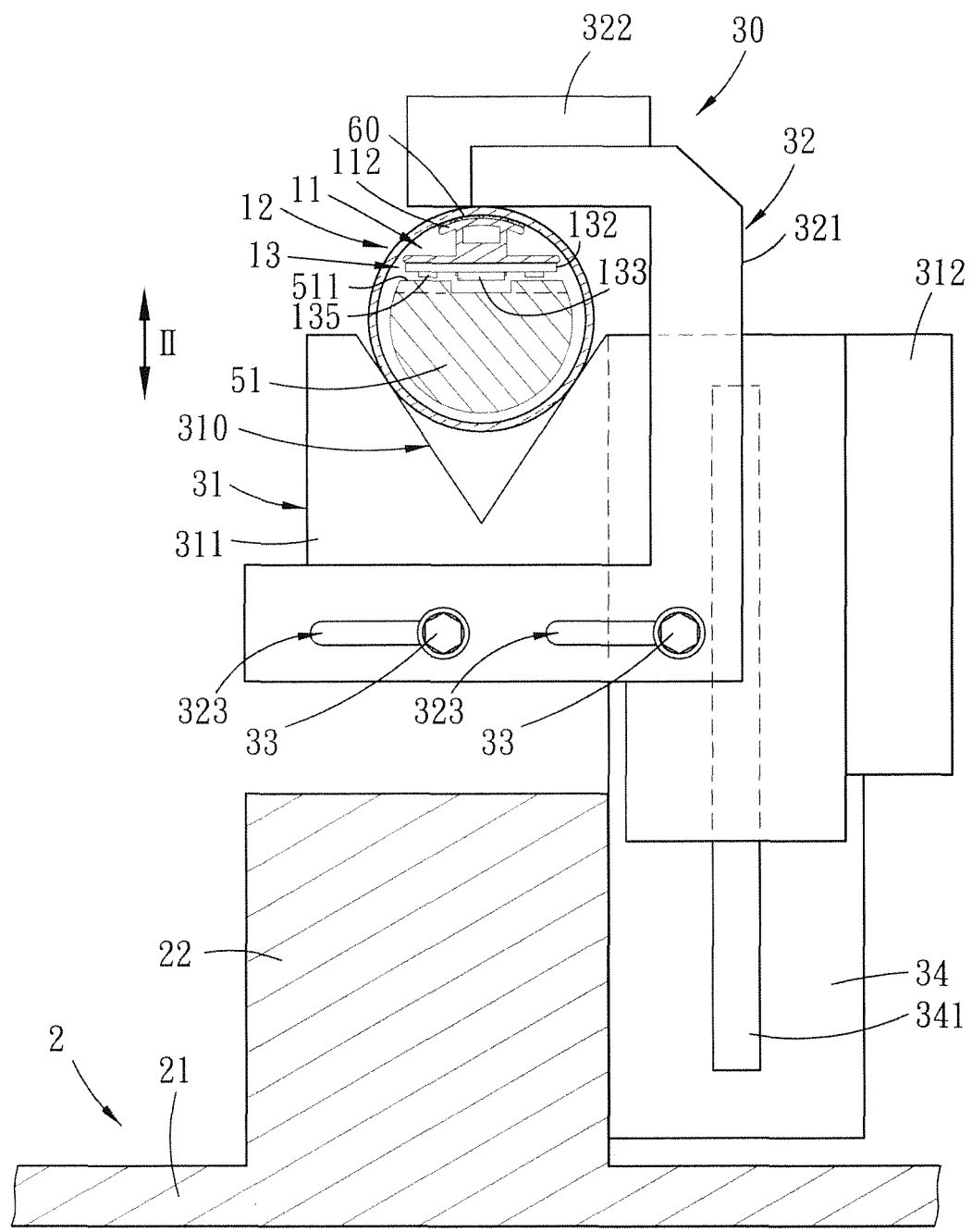
FIG. 29 is a view similar to FIG. 27, but with the tubular body and the adhered heat dissipation substrate being moved to the default height position.

Referring to FIG. 29, in combination with FIG. 20 and step 96, because the timer 76 has a preset value corresponding to the time required for the adhesive 60 to solidify or set and to adhere together the tubular body 12 and the heat dissipation substrate 11. In this embodiment, the preset value is, for example, eight minutes. When the holding device 3 and the tubular body 12 have been in the pressed position for eight minutes, the timer 76 will generate and send a signal to the control unit 72, which then controls the first pneumatic cylinders 35 to drive the positioning plates 31 and the press plates 32 of the holding assemblies 30 to move upward in the up-down direction (II). The positioning plates 31 and the press plates 32, in turn, move upward the tubular body 12 and the heat dissipation substrate 11 adhered thereto to the default height position shown in FIG. 29. As a result, the heat dissipation substrate 11 and the light emitting module 13 are simultaneously separated from the cantilever 51.

Subsequently, with reference to FIGS. 2, 3, and 20, in combination with step 97, the control unit 72 actuates the motor 531 to drive the threaded shaft 532 to rotate. The threaded shaft 532 then drives the conveying assembly 50 to move forward in the front-rear direction (I) until the cantilever 51 is moved away from the tubular body 12. When the conveying assembly 50 drives the plate 54 to move to a position corresponding to that of the front limit switch 77, the front limit switch 77 generates and sends a signal to the control unit 72, which controls the motor 531 to stop actuation. At this time, the cantilever 51 is disposed at the default position, in which the cantilever 51 is spaced apart from and is in front of the first opening 121. Afterwards, the press plate 32 of each holding assembly 30 is moved in the left-right direction (III) (see FIG. 9) to the original position so as to separate the press member 322 of the press plate 32 from the tubular body 12. The assembled tubular body 12 and elongated module 100 can then be removed from the positioning grooves 310 of the positioning plates 31.

Figure 30:
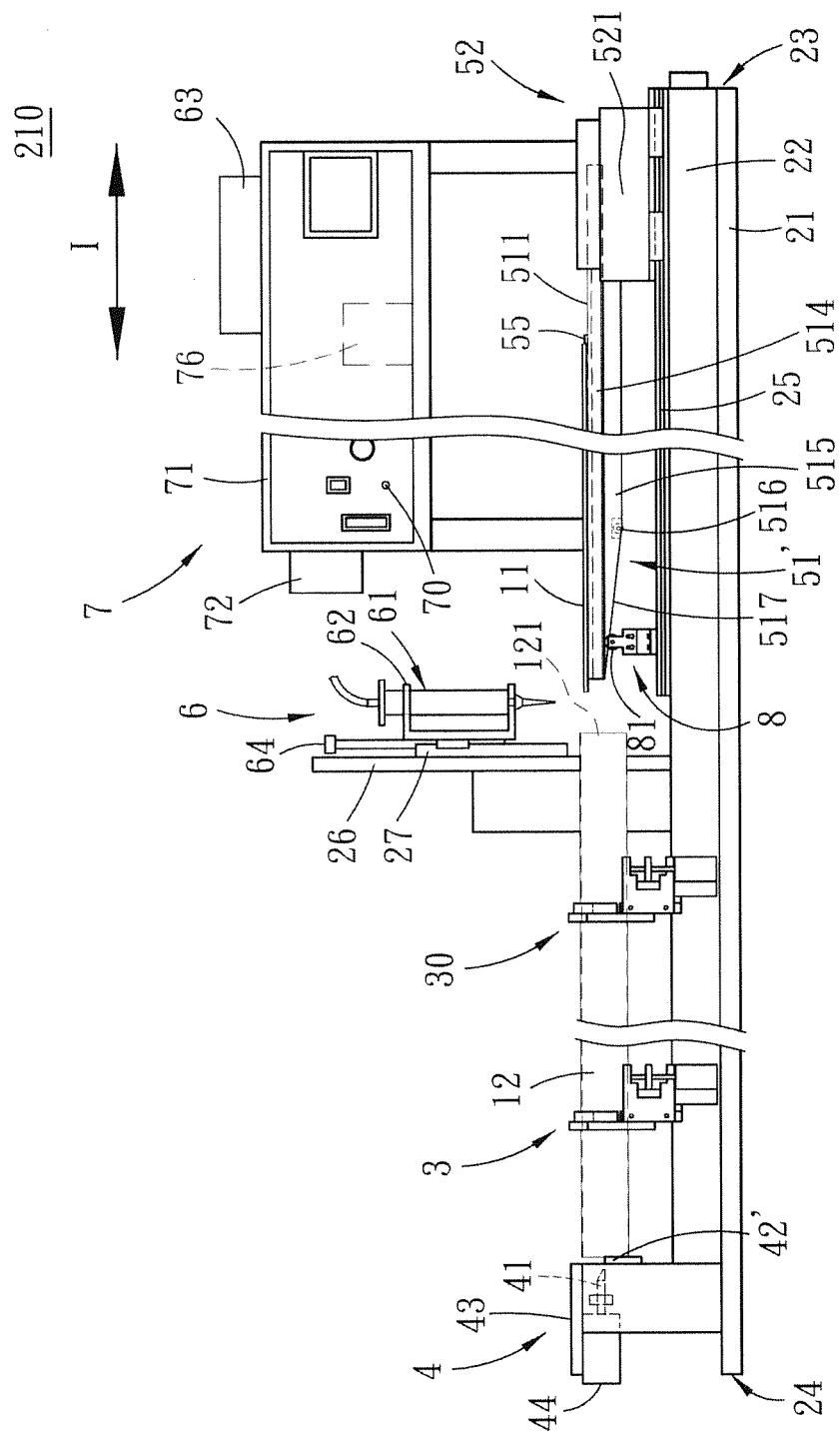
FIG. 30 is a fragmentary schematic front view of an assembling machine according to the second preferred embodiment of the present invention, illustrating a dispenser at a first height position.

FIG. 30 illustrates the second preferred embodiment of an assembling machine 210 according to the present invention. The assembling method and the principles involved are substantially similar to that described in the first preferred embodiment. The structure of the assembling machine 210 is slightly different from that of the first preferred embodiment.

Figure 31:
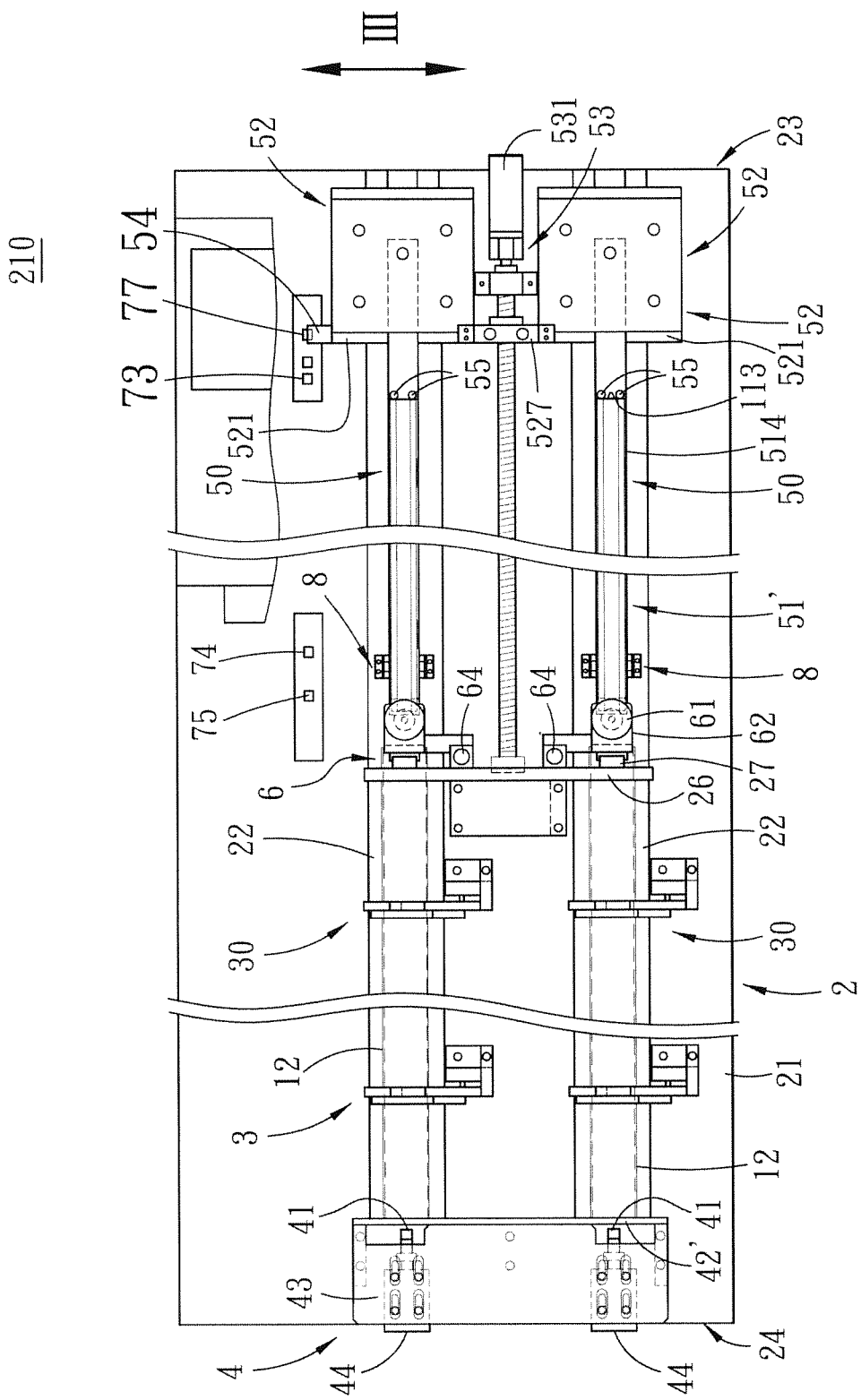
FIG. 31 is a fragmentary schematic top view of FIG. 30.
Figure 32:
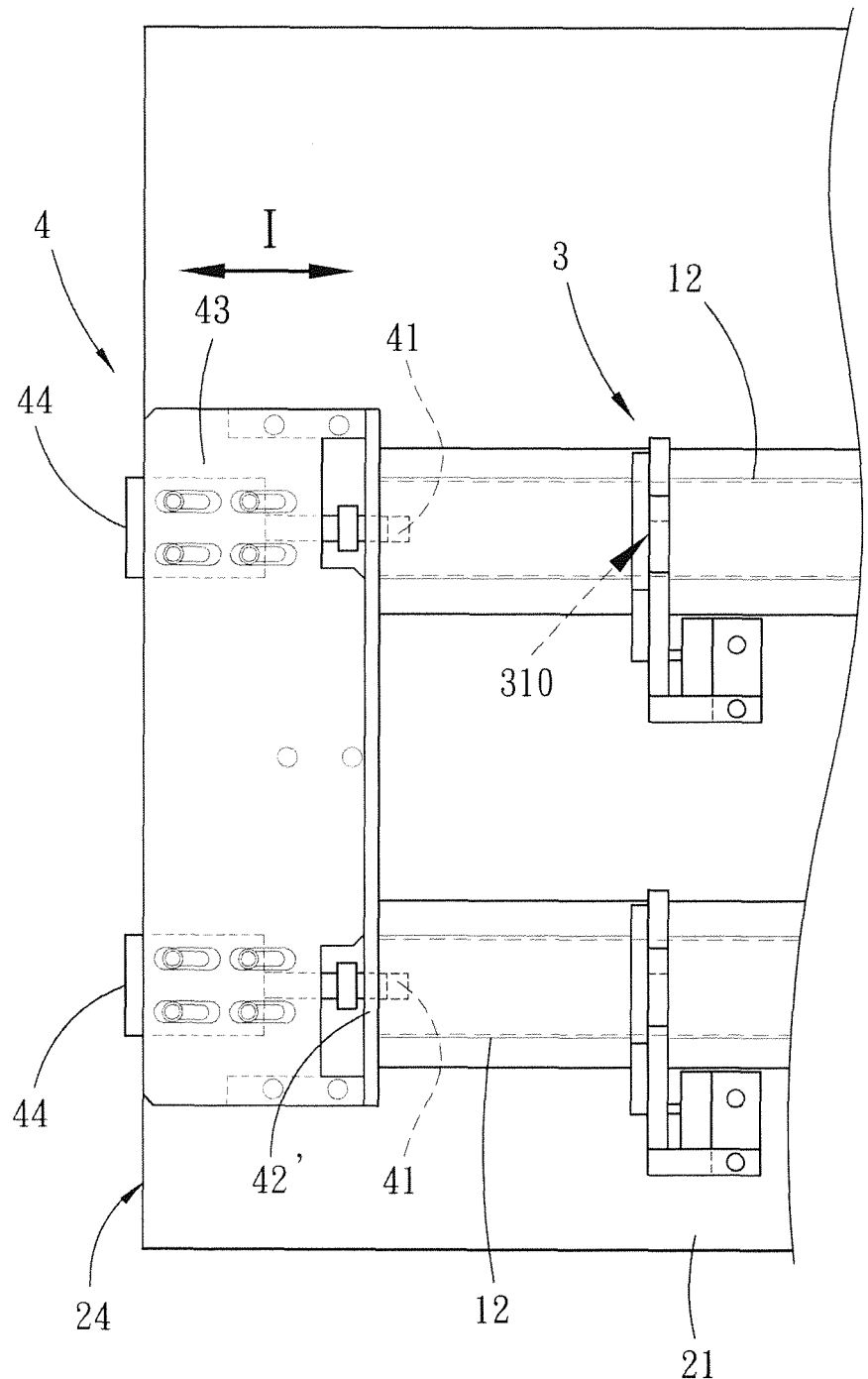
FIG. 32 is an enlarged fragmentary schematic top view of the second preferred embodiment, illustrating supporting arms of a supporting device at a protruding position.

As shown in FIGS. 30, 31, and 32, in this embodiment, the base 2 includes two protruding seats 22 disposed on the base 21 and spaced apart in the left-right direction (III), and two slide rails 25 (only one is shown in FIG. 30) respectively disposed atop the protruding seats 22. The holding device 3 includes two pairs of holding assemblies 30, each pair of which is used to hold a tubular body 12. The supporting device 4 includes a frame 43 disposed on the base plate 21 near the rear end 24 of the base 2, a stop plate 42' disposed at a front end of the frame 43, two second pneumatic cylinders 44 disposed within the frame 43, and two supporting arms 41 connected respectively to the second pneumatic cylinders 44. Each of the second pneumatic cylinders 44 drives a respective supporting arm 41 to move in the front-rear direction (I) between a retracted position, as shown in FIG. 31, in which the respective supporting arm 41 is positioned behind the stop plate 42', and a protruding position, as shown in FIG. 32, in which the respective supporting arm 41 extends beyond the stop plate 42'. When each supporting arm 41 is in the retracted position, each tubular body 12 can be moved directly downward into the positioning grooves 310 of the corresponding pair of the holding assemblies 30, thereby improving efficiency and convenience in positioning each tubular body 12.

The conveying device 5 includes two conveying assemblies 50 that are slidably connected to the respective slide rails 25. The lower plates 521 of the conveying assemblies 50 are connected to each other through the side plate 527. Through this configuration, the drive mechanism 53 can simultaneously drive sliding movement of the two conveying assemblies 50. The cantilever 51' of each conveying assembly 50 includes a holding portion 514 for holding the heat dissipation substrate 11 and the light emitting module 13. The holding portion 514 has a holding surface 511 for holding the light emitting module 13. Each conveying assembly 50 further includes two positioning members 55 disposed on the holding portion 514 of the cantilever 51' and spaced apart in the left-right direction (III). Each positioning member 55 is peg-shaped and is used for abutment of the front end 113 of the heat dissipation substrate 11 thereto so as to position the heat dissipation substrate 11 and the light emitting module 13 on the holding portion 514.

Figure 33:
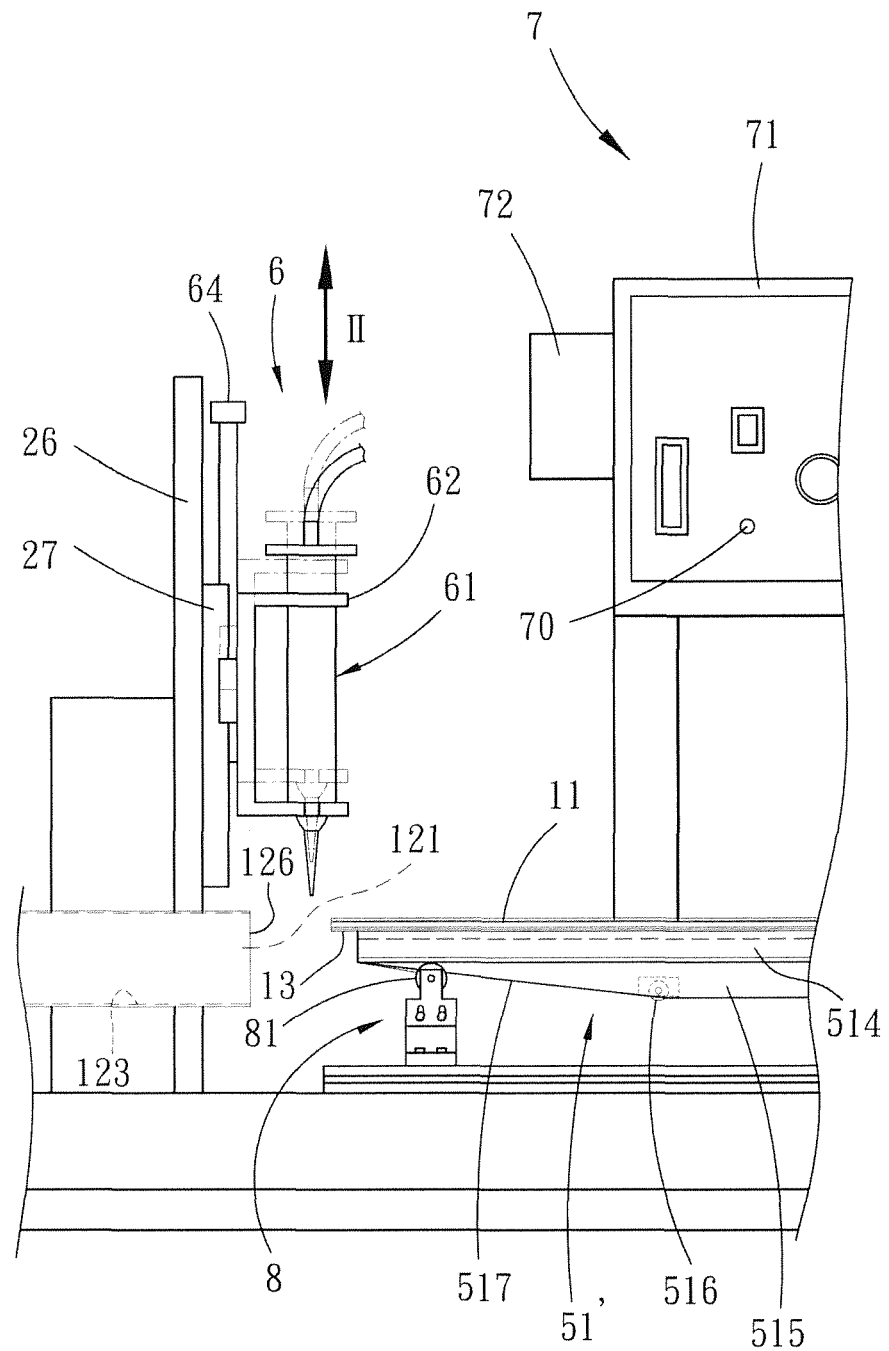
FIG. 33 is an enlarged fragmentary schematic front view of the second preferred embodiment, illustrating a dispenser at a second height position.

With reference to FIGS. 30 and 31, in combination with FIG. 33, the assembling machine 210 further includes two supporting frames 8 disposed respectively on the protruding seats 22. Each supporting frame 8 includes two supporting rollers 81 (only one is shown in FIG. 33) spaced apart in the left-right direction (III) and abutting against a bottom surface of the holding portion 514. Through the configuration of the supporting rollers 81 that support the cantilevers 51' of the respective conveying assemblies 50, the cantilever 51' of each conveying assembly 50 is prevented from sagging when moving the heat dissipation substrate 11 and the light emitting module 13 therealong. Additionally, through abutment of the supporting rollers 81 against the bottom surface of the holding portion 514, friction therebetween can be reduced. Hence, the cantilever 51' of each conveying assembly 50 can smoothly bring the heat dissipation substrate 11 and the light emitting module 13 to move therealong.

As shown in FIGS. 30 and 33, the cantilever 51' of each conveying assembly 50 further includes a protruding plate 515 extending downward from the bottom surface of the holding portion 514 and positioned between the two supporting rollers 81, and a contact roller 516 pivoted to the protruding plate 515 and protruding from a bottom end thereof. The protruding plate 515 has an inclined end face 517 that inclines upwardly and rearwardly and that is connected to the holding portion 514. The contact roller 516 is positioned near a bottom end of the inclined end face 517. A front end of the protruding plate 515 is connected to a rear end of the lower plate 521. When the slide member 52 drives the cantilever 51' to move rearward in the front-rear direction (I), the lower plate 521 provides a force against the protruding plate 515, allowing the slide member 52 to more easily drive the cantilever 51' to move. Through the design of the inclined end face 517 of the cantilever 51', the cantilever 51' can smoothly pass through the first opening 121 and enter the tubular body 12, and can be prevented from getting stuck at an open end 126 of the tubular body 12 having the first opening 121. Additionally, through abutment of the contact roller 516 with the inner surface 123 of the tubular body 12, the protruding plate 515 of the cantilever 51' can be prevented from scratching the inner surface 123 of the tubular body 12. In the present embodiment, the connection of the holding portion 514 and the protruding plate 515 forms a T-shaped profile, but is not limited thereto. The connection thereof may form an arc-shaped or other shaped profile.

As shown in FIGS. 30, 31, and 33, the base 2 further includes an upright plate 26 disposed on the base plate 21, and two spaced-apart slide rails 27 disposed on the upright plate 26. Each of the slide rails 27 extends in the up-down direction (II). The dispensing unit includes two holding frames 62, two dispensers 61 respectively disposed on the holding frames 62, and two spaced-apart third pneumatic cylinders 64 disposed on the upright plate 26. Each holding frame 62 is slidably connected to a respective slide rail 27. Each third pneumatic cylinder 64 is connected to a respective holding frame 62 to drive the respective holding frame 62 to move therealong the corresponding dispenser 61 between a first height position, in which the dispenser 61 is distal from the respective cantilever 51', and a second height position, in which the dispenser 61 is proximate to the respective cantilever 51'. The second height position is lower than the first height position. When each dispenser 61 is at the first height position, the heat dissipation substrate 11 and the light emitting module 13 are more easily placed on the holding portion 514 of the respective cantilever 51', thereby preventing the heat dissipation substrate 11 from accidentally bumping the dispenser 61 during the placement thereof.

Figure 34:
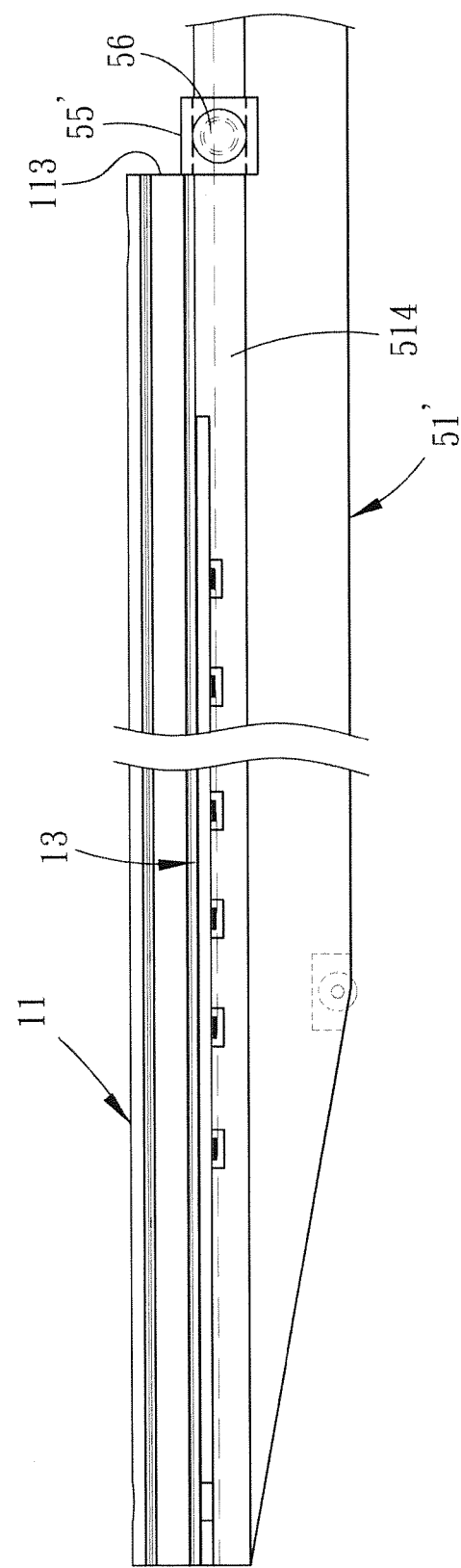
FIG. 34 is a fragmentary schematic front view of another implementation of the second preferred embodiment, illustrating a positioning member being sleeved on a holding portion of the cantilever and abutting against a front end of the heat dissipation substrate.
Figure 35:
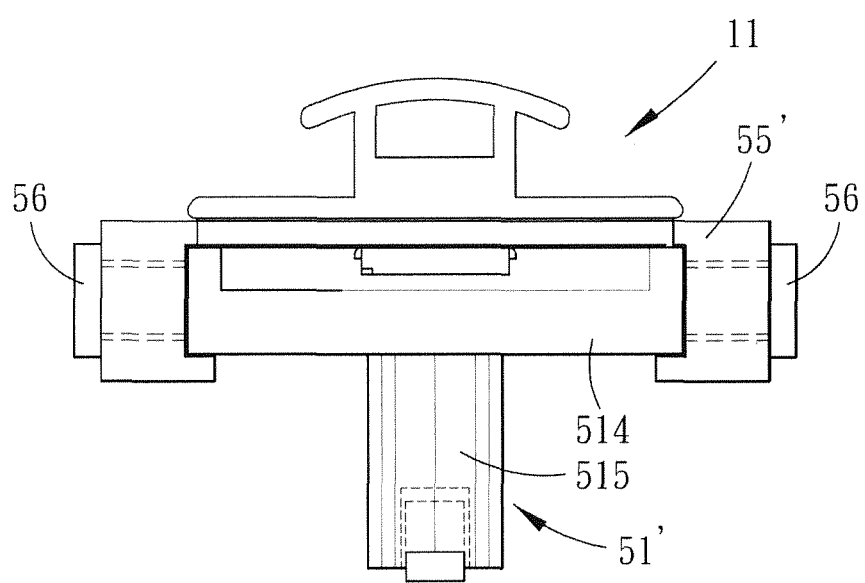
FIG. 35 is an enlarged schematic side view of the another implementation of the second preferred embodiment, illustrating the positioning member being secured to the holding portion by screws.

FIGS. 34 and 35 illustrate another implementation of the positioning member 55' of the conveying assembly 50. The positioning member 55' is movably sleeved on the holding portion 514 of the cantilever 51' for abutment of the front end 113 of the heat dissipation substrate 11 thereagainst. By using two screws 56 that respectively engage the left and right sides of the positioning member 55' and that abut against the holding portion 514 of the cantilever 51', the positioning member 55' can be fixed to the holding portion 514. Additionally, because the positioning member 55' is movably sleeved on the holding portion 514, and because the screws 56 can adjustably position the positioning member 55' to a desired position, when the cantilever 51' is used to support a heat dissipation substrate which has a different length, the positioning member 55' can be adjusted according to the length of the heat dissipation substrate 11 and positioned on the holding portion 514. This provides flexibility in the use of the assembling machine 210.

To sum up, each embodiment of the assembling machine 200, 210 uses the design of the holding device 3, the supporting device 4, the conveying device 5, the dispensing device 6, and the control device 7 automatically assemble the elongated module 100 inside the tubular body 12, thereby increasing the speed of assembly, enhancing the efficiency thereof and reducing the production costs associated therewith. Further, the heat dissipation substrate 11 of the elongated module 100 will not scratch the inner surface 123 of the tubular body 12 during assembly thereof, so that discarding of the tubular body 12 due to damage can be reduced, thereby enhancing the production yield. Additionally, by using the dispensing device 6 to replace manual dispensing of the adhesive, the adhesive can be coated uniformly on the joint surface 112 of the heat dissipation substrate 11, thereby preventing nonuniform coating of the adhesive. Therefore, the objects of the present invention can be achieved.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An assembling method for assembling an elongated module into tubular body, said tubular body having opposite first and second openings, said assembling method comprising:
   (A) sliding a conveying assembly of a conveying device rearwardly so that the elongated module held by the conveying assembly is moved rearwardly toward the tubular body in proximity to the first opening, wherein the tubular body is positioned on a holding device;
   (B) actuating a dispensing device to dispense adhesive on a joint surface of the elongated module as the elongated module is moved rearwardly, wherein a cantilever of the conveying assembly drives the adhesive-coated elongated module into the tubular body through the first opening;
   (C) stopping the dispensing device from dispensing the adhesive on the joint surface of the elongated module;
   (D) stopping movement of the conveying assembly so that a portion of the elongated module protrudes from the second opening;
   (E) actuating the holding device to move downwardly so as to place the tubular body in a pressed position, in which an inner surface of the tubular body is pressed against and adhered to the joint surface of the elongated module; and
   (F) actuating the holding device to move upwardly so as to place the tubular body with the adhered elongated module in a default height position to thereby separate the elongated module from the cantilever.

2. The assembling method as claimed in claim 1, wherein in step (C), the portion of the elongated module that protrudes from the second opening abuts against a supporting device that extends into the tubular body through the second opening.

3. The assembling method as claimed in claim 2, wherein in step (B), when a plate of the conveying assembly and a first sensor of a control device correspond in position, the first sensor transmits a signal to a control unit which is electrically coupled to the dispensing device, so that the control unit controls the dispensing device to start dispensing the adhesive; and in step (C), when the plate of the conveying assembly and a second sensor of the control device correspond in position, the second sensor transmits a signal to the control unit, so that the control unit controls the dispensing device to stop dispensing the adhesive.

4. The assembling method as claimed in claim 3, wherein in step (D), when the plate of the conveying assembly and a rear limit switch of the control device correspond in position, the rear limit switch transmits a signal to the control unit, so that the control unit controls stop movement of the conveying assembly and subsequently controls the holding device to move downwardly to thereby place the tubular body in the pressed position; in step (E), a timer of the control device is used to measure a length of time that the tubular body remains at the pressed position; and in step (F), when the timer reaches a preset value, the timer transmits a signal to the control unit, so that the control unit controls the holding device to move upwardly to place the tubular body at the default height position.

5. The assembling method as claimed in claim 4, further comprising the step of:
(G) sliding the conveying assembly forwardly until the cantilever is at a default position, in which the cantilever is spaced apart from and is disposed frontwardly of the first opening of the tubular body, wherein when the plate of the conveying assembly and a front limit switch of the control device correspond in position, the front limit switch transmits a signal to the control unit, so that the control unit controls stop movement of the conveying assembly to thereby position the cantilever at the default position.

* * * * *